(12) United States Patent
Ogawa et al.

(10) Patent No.: US 10,630,955 B2
(45) Date of Patent: Apr. 21, 2020

(54) DISPLAY DEVICE, METHOD OF DRIVING DISPLAY DEVICE, AND ELECTRONIC DEVICE

(71) Applicant: SONY CORPORATION, Tokyo (JP)

(72) Inventors: Ryo Ogawa, Kanagawa (JP); Tomoya Yano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 270 days.

(21) Appl. No.: 15/558,279

(22) PCT Filed: Jan. 20, 2016

(86) PCT No.: PCT/JP2016/051529
§ 371 (c)(1),
(2) Date: Sep. 14, 2017

(87) PCT Pub. No.: WO2016/152217
PCT Pub. Date: Sep. 29, 2016

(65) Prior Publication Data
US 2018/0063502 A1 Mar. 1, 2018

(30) Foreign Application Priority Data

Mar. 23, 2015 (JP) .................................. 2015-059631
Dec. 17, 2015 (JP) .................................. 2015-246178

(51) Int. Cl.
*H04N 13/117* (2018.01)
*H04N 13/376* (2018.01)
(Continued)

(52) U.S. Cl.
CPC ....... *H04N 13/117* (2018.05); *G02B 27/2214* (2013.01); *G06F 3/013* (2013.01);
(Continued)

(58) Field of Classification Search
CPC ... G02B 27/2214; G06F 3/013; H04N 13/117; H04N 13/167; H04N 13/31; H04N 13/324; H04N 13/351; H04N 13/376
See application file for complete search history.

(56) References Cited

U.S. PATENT DOCUMENTS

| | | | |
|---|---|---|---|
| 2011/0102423 A1* | 5/2011 | Nam ..................... | H04N 13/305 345/419 |
| 2012/0200677 A1* | 8/2012 | Saishu ................. | G02B 27/225 348/51 |

(Continued)

FOREIGN PATENT DOCUMENTS

| | | |
|---|---|---|
| CN | 103313077 A | 9/2013 |
| JP | 9-160144 A | 6/1997 |

(Continued)

OTHER PUBLICATIONS

International Search Report and Written Opinion of PCT Application No. PCT/JP2016/051529, dated Apr. 12, 2016, 09 pages of ISRWO.

*Primary Examiner* — Viet D Pham
(74) *Attorney, Agent, or Firm* — Chip Law Group

(57) ABSTRACT

A display unit including a display area, an optical separating unit configured to separate an image displayed in the display area into images to be observed at a plurality of predetermined observation positions, respectively, a position detecting unit which detects position information of an image observer, and a driving unit which drives the display unit are provided, and the driving unit controls the image to be displayed on the display unit such that a right-eye image is observed at each of a plurality of observation positions located in the vicinity of an observer's right eye and a left-eye image is observed at each of a plurality of obser- (Continued)

vation positions located in the vicinity of an observer's left eye on the basis of the position information from the position detecting unit.

14 Claims, 31 Drawing Sheets

(51) Int. Cl.
| | |
|---|---|
| *H04N 13/324* | (2018.01) |
| *G02B 27/22* | (2018.01) |
| *H04N 13/351* | (2018.01) |
| *H04N 13/167* | (2018.01) |
| *H04N 13/31* | (2018.01) |
| *G06F 3/01* | (2006.01) |

(52) U.S. Cl.
CPC ........... *H04N 13/167* (2018.05); *H04N 13/31* (2018.05); *H04N 13/324* (2018.05); *H04N 13/351* (2018.05); *H04N 13/376* (2018.05)

(56) References Cited

U.S. PATENT DOCUMENTS

| | | | |
|---|---|---|---|
| 2013/0147931 A1* | 6/2013 | Ohba | G02B 27/2214 348/54 |
| 2013/0235005 A1 | 9/2013 | Ohyama et al. | |
| 2013/0258057 A1* | 10/2013 | Mishima | G02B 27/2214 348/46 |
| 2013/0278736 A1 | 10/2013 | Saito | |
| 2013/0293691 A1* | 11/2013 | Saito | G02B 27/2214 348/59 |
| 2014/0168394 A1* | 6/2014 | Shimoyama | G02B 27/2214 348/59 |

FOREIGN PATENT DOCUMENTS

| | | |
|---|---|---|
| JP | 09-160144 A | 6/1997 |
| JP | 2000-047139 A | 2/2000 |
| JP | 2012-249060 A | 12/2012 |
| JP | 2013-186221 A | 9/2013 |
| WO | 2012/165133 A1 | 12/2012 |

* cited by examiner

Vi_Mod [a, b]

j-TH GROUP COLUMN: 1 2 3 4 5 6 7 8 9 10 11 12 13 14 15 16 17 18 19 20 21 22 23 24 k-TH GROUP ROW: b = 1, 2, 3, 4, 5, 6

| a \ b | 1 | 2 | 3 | 4 | 5 | 6 |
|---|---|---|---|---|---|---|
| 1 | 22 | 3 | 18 23 | 14 19 24 | 10 15 20 | 6 11 16 21 |
| 2 | 3 | 18 23 | 14 19 24 | 10 15 20 | 6 11 16 21 | 2 7 12 17 |
| 3 | 8 | 4 | 24 | 20 | 16 21 | 12 17 |
| 4 | 13 | 9 | 5 | 1 | 21 | 17 |
| 5 | 18 23 | 14 19 24 | 10 15 20 | 6 11 16 21 | 2 7 12 17 | 3 8 13 |
| 6 | 14 19 24 | 10 15 20 | 6 11 16 21 | 2 7 12 17 | 3 8 13 | 9 |
| 7 | 10 15 20 | 6 11 16 21 | 2 7 12 17 | 3 8 13 | 9 | 5 |
| 8 | 6 11 16 21 | 2 7 12 17 | 3 8 13 | 9 | 5 | 1 |
| 9 | 2 7 12 17 | 3 8 13 | 9 | 5 | 1 | 21 |
| 10 | 3 | 9 | 5 | 1 | 21 | 17 |
| 11 | 8 13 | 14 | 10 | 6 | 2 | 22 |
| 12 | 18 | 19 | 15 | 11 | 7 | 3 |
| 13 | 23 | 24 | 20 | 16 | 12 | 8 |
| 14 | 3 8 13 | 9 | 5 | 1 | 21 | 17 |
| 15 | 9 | 5 | 1 | 21 | 17 | 13 |
| 16 | 5 | 1 | 21 | 17 | 13 | 9 |

(Figure depicts a Vi_Mod[a,b] table with X→ and Y↓ axis indicators.)

PRIOR ART

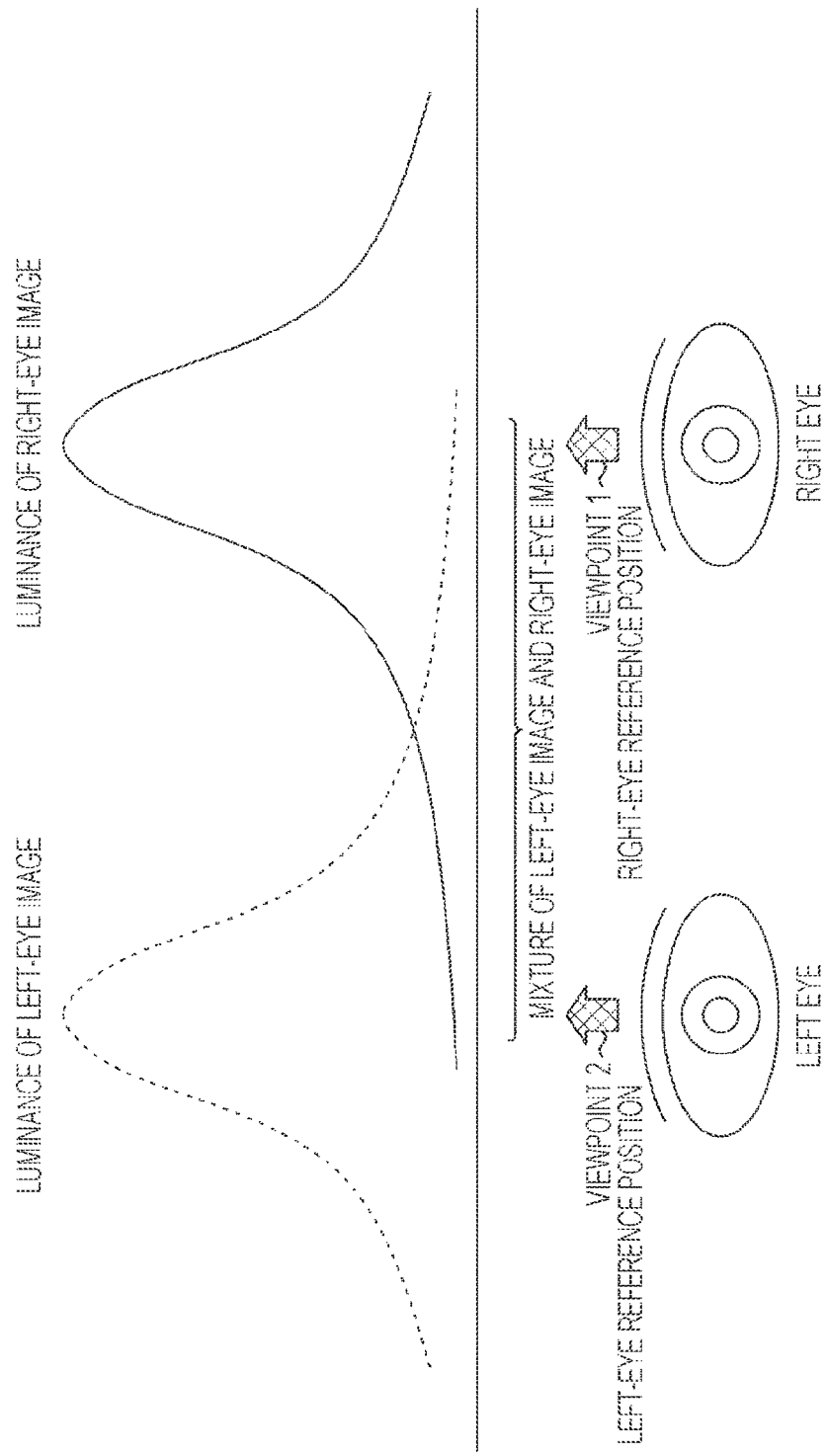

DISPLAY DEVICE, METHOD OF DRIVING DISPLAY DEVICE, AND ELECTRONIC DEVICE

CROSS REFERENCE TO RELATED APPLICATIONS

This application is a U.S. National Phase of International Patent Application No. PCT/JP2016/051529 filed on Jan. 20, 2016, which claims priority benefit of Japanese Patent Application No. JP 2015-059631 filed in the Japan Patent Office on Mar. 23, 2015 and also claims priority benefit of Japanese Patent Application No. JP 2015-246178 filed in the Japan Patent Office on Dec. 17, 2015. Each of the above-referenced applications is hereby incorporated herein by reference in its entirety.

TECHNICAL FIELD

The present disclosure relates to a display device, a method of driving the display device, and an electronic device. More specifically, this relates to a display device capable of displaying an image with parallax, thereby realizing stereoscopic vision, a method of driving such display device, and an electronic device provided with such display device.

BACKGROUND ART

Various display devices are known for realizing stereoscopic vision by observing two images with parallax by an image observer. As a naked-eye type display device, practical realization of a display device obtained by combining an optical separating unit formed of a parallax barrier or a lens sheet provided with a lens array and a display unit displaying a two-dimensional image is promoted.

A conceptual diagram of operation of the naked-eye type display device is illustrated in FIG. 30.

In FIG. 30, a group of rays emitted from pixels with reference signs $1_R$, $3_R$, $5_R$, $7_R$, and $9_R$ reaches a viewpoint 1 and a group of rays emitted from pixels with reference signs $2_L$, $4_L$, $6_L$, $8_L$, and $10_L$ reaches a viewpoint 2. Therefore, at a position apart from the display unit by a predetermined distance, the image at the viewpoint 1 and the image at the viewpoint 2 are independently observed.

When a right eye and a left eye of the image observer are positioned at the viewpoint 1 and the viewpoint 2 respectively, if a right-eye image is displayed by the pixels with reference signs $1_R$, $3_R$, $5_R$, $7_R$, and $9_R$ and a left-eye image is displayed by the pixels with reference signs $2_L$, $4_L$, $6_L$, $8_L$, and $10_L$, the image observer recognizes the image as a stereoscopic image.

If the image observer observes the image at a position deviated from the viewpoint 1 and viewpoint 2, images for different viewpoints are mixedly observed. Herein, the fact that the images for different viewpoints are mixedly observed is referred to as crosstalk. The crosstalk damages a stereoscopic effect. Also, by observing the image at a position deviated far away, a state such as "reverse viewing" in which the left-eye image and the right-eye image are displaced with each other occurs. The image observer perceives the image in which the front and the back are inverted, and feels unnatural or uncomfortable.

In order to solve such a problem, for example, a display device in which a position of an image observer is detected and contents of an image to be displayed on a display unit are changed is proposed (refer to Patent Document 1).

CITATION LIST

Patent Document

Patent Document 1: Japanese Patent Application Laid-Open No. 2000-47139

SUMMARY OF THE INVENTION

Problems to be Solved by the Invention

In practice, in a case of the display device having the configuration as illustrated in FIG. 30, it is difficult to display the image completely separated by an effect of diffraction or the like by the optical separating unit. As illustrated in FIG. 31, at the viewpoint 1, in addition to the right-eye image, the left-eye image is observed to some extent by the diffraction or the like. Also, at the viewpoint 2, in addition to the left-eye image, the right-eye image is observed to some extent by the diffraction or the like.

Therefore, an object of the present disclosure is to provide a display device capable of observing images with small crosstalk, a method of driving the display device, and an electronic device.

Solutions to Problems

A display device according to the present disclosure for achieving the above-described object is a display device provided with:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

A method of driving a display device according to the present disclosure for achieving the above-described object is a method of driving a display device provided with:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

An electronic device according to the present disclosure for achieving the above-described object is an electronic device provided with a display device, the display device including:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

Effects of the Invention

In the display device according to the present disclosure, an image to be displayed on a display unit is controlled such that a right-eye image is observed at each of a plurality of observation positions located in the vicinity of a right eye of an observer and a left-eye image is observed at each of a plurality of observation positions located in the vicinity of a left eye of the observer on the basis of the position information from the position detecting unit. Therefore, crosstalk may be suppressed, and even if the image is observed at a position deviated from an observation position in design, it is possible to observe the image with an excellent stereoscopic effect.

BRIEF DESCRIPTION OF DRAWINGS

FIG. 12 is a view for illustrating pixels which display on the basis of the right-eye image data in the (j, k) pixel group in a case where the image observer observes the image at the reference position in design.

FIG. 13 is a view for illustrating pixels which display on the basis of the left-eye image data in the (j, k) pixel group in a case where the image observer observes the image at the reference position in design.

FIG. 18 is a schematic diagram for illustrating an example of a corrected viewpoint number.

FIG. 19 is a view for illustrating pixels which display on the basis of the right-eye image data in the (j, k) pixel group in a case where the viewpoint number of the pixel is corrected.

FIG. 20 is a view for illustrating the pixels which display on the basis of the left-eye image data in the (j, k) pixel group in a case where the viewpoint number of the pixel is corrected.

FIG. 31 is a schematic diagram for illustrating that a left-eye image and a right-eye image are mixedly observed.

MODE FOR CARRYING OUT THE INVENTION

Figure 1:
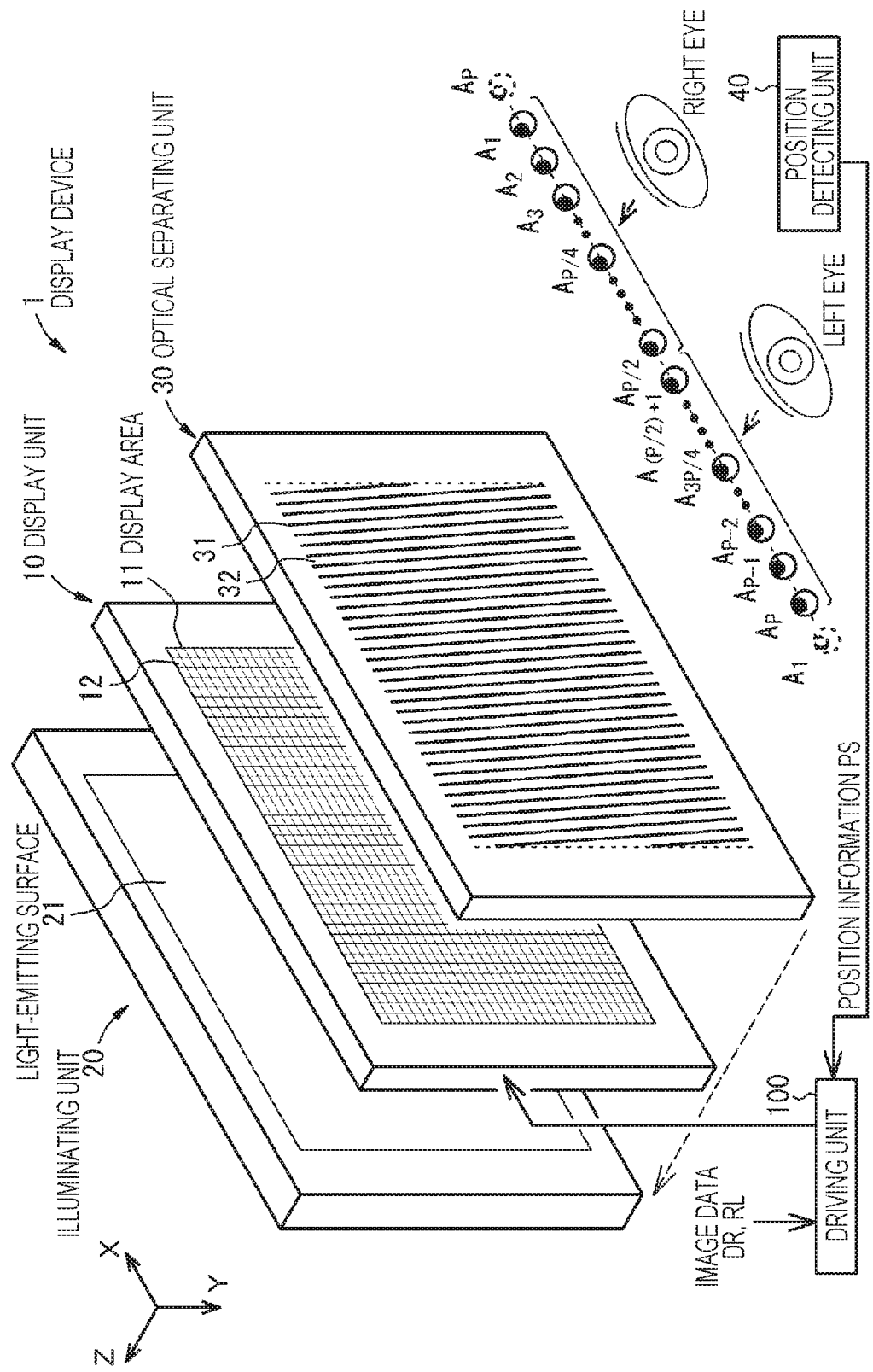
FIG. 1 is a schematic perspective view when a display device used in an embodiment is virtually separated.

Hereinafter, the present disclosure is described on the basis of embodiments with reference to the drawings. The present disclosure is not limited to the embodiments, and various numerical values and materials in the embodiments are examples. In the following description, the same reference sign is used for the same elements or elements having the same function, and the description is not repeated. Meanwhile, the description is given in the following order.

1. Description regarding display device and method of driving the same according to present disclosure in general
2. Description of display device used in each embodiment
3. First embodiment
4. Second embodiment
5. Third embodiment
6. Application example (example of electronic device) and others

[Description Regarding Display Device According to Present Disclosure in General]

In a display device according to the present disclosure, a display device used in a method of driving the display device according to the present disclosure, or a display device used in an electronic device of the present disclosure (hereinafter, they are sometimes collectively and simply referred to as "display device according to the present disclosure"), a driving unit may be configured to select image data corresponding to a pixel which should display a right-eye image from right-eye image data which displays the right-eye image on an entire surface of a display area to drive the pixel and select image data corresponding to a pixel which should display a left-eye image from left-eye image data which displays the left-eye image on the entire surface of the display area to drive the pixel.

In the present disclosure including the above-described various preferable configurations, it may be configured such that, when a plurality of predetermined observation positions is represented as observation positions $A_1$ to $A_P$, an observation position $A_{P/4}$ is set to correspond to a right-eye reference position and an observation position $A_{3P/4}$ is set to correspond to a left-eye reference position.

Meanwhile, in a case where values such as "P/4" and "3P/4" are not integers, a position between the observation position and the adjacent observation position may correspond to the reference position.

Meanwhile, the reference position may be determined according to a design of the display device. Herein, this is a "position optimum for an observer to view the display device (optimum viewing position), the position from where the observer looks at the front of the display device".

A value of "P" may be determined according to the design of the display device. The value of "P" may be fixed or variable. For example, a mode in which this is variably controlled according to position information is also possible. Meanwhile, from a viewpoint of displaying a smooth image at the time of head tracking, it is preferable to set the value of "P" to a value not smaller than 8 at least.

In this case, the driving unit may be configured to control an image to be displayed on a display unit such that the right-eye image is observed at the observation positions $A_1$ to $A_{P/2}$ and the left-eye image is observed at the observation positions $A_{(P/2)+1}$ to $A_P$ when observer's eyes are at predetermined reference positions, and control the image to be displayed on the display unit such that the image is observed in a state similar to that when the observer's eyes are at the predetermined reference positions when the observer's eyes are at positions deviated from the predetermined reference positions.

In this case, it may be configured such that a pixel group formed of a plurality of pixels is formed in the display area on the basis of an arrangement relationship between an array of the pixels and a structure body of an optical separating unit, and the driving unit may be configured to control the image to be displayed on the display unit by correcting a viewpoint number corresponding to the pixel on the basis of a reference viewpoint number determined by a correspondence relationship between the pixels forming the pixel group and the observation positions $A_1$ to $A_P$ and position information from a position detecting unit. Then, the driving unit may be configured to correct the viewpoint number of the pixel on the basis of the reference viewpoint number and the position information from the position detecting unit and select either the right-eye image data or the left-eye image data on the basis of a value of the corrected viewpoint number to drive the pixel. Furthermore, the driving unit may be configured to multiply a coefficient according to the value of the viewpoint number by the image data to drive the pixel.

In this case, the driving unit may be configured to be provided with a table storing the reference viewpoint number commonly used in each pixel group.

In this case, the optical separating unit is formed of a lens sheet, and the driving unit may be configured to correct the viewpoint number of the pixel on the basis of the reference viewpoint number, the position information from the position detecting unit, and an optical characteristic of the lens sheet.

Alternatively, it may also be configured such that a correcting unit which corrects the image to be displayed on the display unit is provided so as to compensate for an effect due to deviation from the reference position.

In this case, the correcting means includes a plurality of tables each storing the correspondence relationship between the pixels forming the pixel group and the observation positions $A_1$ to $A_P$ corresponding to a position of the pixel group in the display area, and the driving unit may be configured to control the image to be displayed by the pixel group on the basis of the table corresponding to the position of the pixel group in the display area and the position information from the position detecting unit.

Alternatively, in this case, the correcting unit may be configured to control the image to be displayed by a relational expression based on the correspondence relationship between the pixels forming the pixel group and the observation positions $A_1$ to $A_P$ corresponding to the position of the pixel group in the display area.

The display device may also have a configuration in which the optical separating unit is arranged between the display unit and an image observer. Alternatively, in a case where a transmissive display panel is used as the display unit, the optical separating unit may be arranged between the display unit and an illuminating unit. In the former case, a widely well-known display device such as a liquid crystal display panel, an electroluminescence display panel and a plasma display panel may be used as the display unit. In the latter case, a well-known transmissive display panel such as a transmissive liquid crystal display panel may be used, for example, as the display unit. The display unit may be a monochrome-display type or a color-display type.

A configuration, arrangement and the like of the optical separating unit may be appropriately set according to specifications and the like of the display device. In a case where a parallax barrier is used as the optical separating unit, a fixed parallax barrier or a dynamically switchable parallax barrier may be used.

The fixed parallax barrier may be formed by well-known methods such as combination of a photolithography method and an etching method, various printing methods such as a screen printing method, an ink-jet printing method, and a metal mask printing method, a plating method (electroplating method or electroless plating method), and a lift-off method by using a base material formed of a well-known transparent material such as resin and glass. On the other hand, the dynamically switchable parallax barrier may be formed of, for example, an electrically switchable light valve provided with a liquid crystal material layer. A type of a material forming the light valve using the liquid crystal material layer and an operation mode of the liquid crystal material layer are not especially limited. In some cases, a monochrome-display liquid crystal display panel may be used as the dynamic parallax barrier. A size of an opening of the parallax barrier and the like may be appropriately set according to the specifications and the like of the display device.

Also, in a case where the lens sheet is used as the optical separating unit, a configuration and a structure of the lens sheet are not especially limited. For example, the lens sheet integrally molded by using the above-described well-known transparent material and the like may be used, and the lens sheet obtained by forming a lens array by using a photosensitive resin material and the like, for example, on a sheet-shaped base material formed of the above-described material and the like may be used. Furthermore, a configuration provided with a gradient index lens using a liquid crystal material as a dynamically controllable lens is also possible. Optical power of the lens array, a pitch of the lens array and the like may be appropriately set according to the specifications and the like of the display device.

In a configuration in which the display device is provided with the transmissive display panel and the illuminating unit, a widely well-known illuminating unit may be used. A configuration of the illuminating unit is not especially limited. Generally, the illuminating unit may be formed of well-known members such as a light source, a prism sheet, a diffusion sheet, a light guide plate and the like.

In the embodiment to be described later, although it is described that an active matrix type transmissive liquid crystal display panel is used as the display unit, the fixed parallax barrier is used as the optical separating unit, and the optical separating unit is arranged between the display unit and the image observer, this is merely an example.

The liquid crystal display panel is formed of, for example, a front panel provided with a transparent common electrode, a rear panel provided with a transparent pixel electrode, and a liquid crystal material arranged between the front panel and the rear panel. The operation mode of the liquid crystal display panel is not especially limited. A configuration driven in a so-called TN mode, and a configuration driven in a VA mode or an IPS mode are also possible. In a case of a color liquid crystal display panel, it is configured such that a color filter covered with an overcoat layer formed of acrylic resin or epoxy resin is provided on an inner surface of a substrate, and the transparent common electrode is formed on the overcoat layer.

Specifically, although some image display resolution such as (1920, 1035), (720, 480), and (1280, 960) may be exemplified in addition to VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536) as a value of the resolution (M, N) of the display unit, this is not limited to these values.

A configuration of the position detecting unit which detects the position information of the image observer is not especially limited. These may be configured by using a well-known circuit element and the like on the basis of, for example, head tracking technology, face tracking technology and the like.

The driving unit which drives the display unit may be formed of various circuits such as an image signal processing unit, a timing control unit, a data driver, and a gate driver, for example. They may be formed by using a well-known circuit element and the like.

[Description of Display Device Used in Each Embodiment]

FIG. 1 is a schematic perspective view when the display device used in each embodiment is virtually separated.

As illustrated in FIG. 1, a display device 1 is provided with a display unit 10 including a display area 11 which displays a two-dimensional image, an optical separating unit 30 configured to separate the image displayed in the display area 11 into images observed at a plurality of predetermined observation positions set to be arranged at intervals in a horizontal direction, respectively, a position detecting unit 40 which detects position information of the image observer, and a driving unit 100 which drives the display unit 10.

Pixels 12 in the display area 11 are arranged in a matrix in a horizontal direction and in a vertical direction, structure bodies of the optical separating unit 30 are arranged at a predetermined angle with respect to the vertical direction, and an array pitch in the horizontal direction of the structure bodies is set to be a non-integral multiple of the array pitch in the horizontal direction of the pixels 12 in the display area 11. The array pitch in the horizontal direction of the structure bodies and the array pitch in the horizontal direction of the pixels 12 in the display area 11 are described in detail with reference to FIGS. 2 to 5 to be described later.

The driving unit 100 controls the image to be displayed on the display unit 10 such that the right-eye image is observed at each of a plurality of observation positions located in the vicinity of an observer's right eye and the left-eye image is observed at each of a plurality of observation positions located in the vicinity of an observer's left eye on the basis of the position information from the position detecting unit 40.

More specifically, the driving unit 100 selects image data corresponding to the pixel 12 which should display the right-eye image from the right-eye image data which displays the right-eye image on an entire surface of the display area 11 to drive the pixel 12, and selects image data corresponding to the pixel 12 which should display the left-eye image from the left-eye image data which displays the left-eye image on the entire surface of the display area 11 to drive the pixel 12.

Operation of the driving unit 100 is described later in detail with reference to FIGS. 10 to 21 to be described later.

The display unit 10 is formed of an active matrix type color liquid crystal display panel. An illuminating unit 20 which emits light is arranged on a rear surface of the display unit 10.

Figure 2:
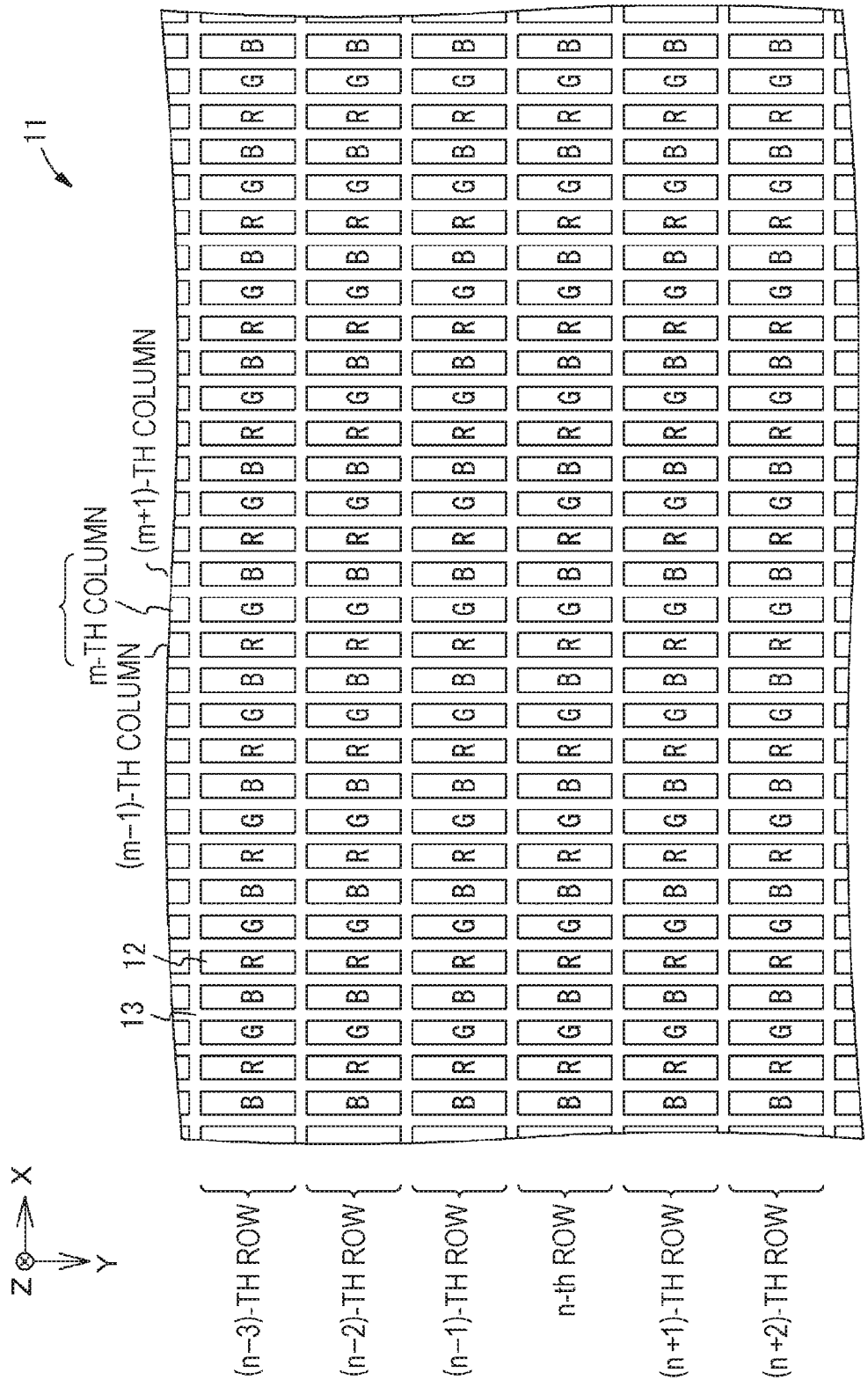
FIG. 2 is a schematic plan view of a part of a display area for illustrating an arrangement relationship of pixels in a display area of a display unit.

FIG. 2 is a schematic plan view of a part of the display area for illustrating an arrangement relationship of the pixels in the display area of the display unit.

In the display area 11, a total of M×N pixels 12, M in the horizontal direction (X direction in the drawing) and N in the vertical direction (Y direction in the drawing), are arranged in a matrix. A black matrix 13 is provided between the pixel 12 and the pixel 12. The pixel 12 in an m-th column (where m=1, 2, . . . , M) and an n-th row (where n=1, 2, . . . , N) is represented as an (m, n)-th pixel 12 or a pixel $12_{(m,n)}$. In FIG. 2, a red display pixel, a green display pixel, and a blue display pixel are represented by using reference signs R, G, and B, respectively.

For example, the pixels 12 are arrayed such that the red display pixels are arrayed in a first column, the green display pixels are arrayed in a second column, and the blue display pixels are arrayed in a third column, and they are similarly repeatedly arrayed in fourth and subsequent columns. That is, the pixel in the m-th column is the red display pixel if the remainder when dividing "m−1" by 3 is 0, the green display pixel if the remainder is 1, and the blue display pixel if the remainder is 2.

Resolution of the display unit 10 illustrated in FIG. 1 is (1920, 1080), for example. Assuming that one pixel of the display unit 10 is formed of a group of the red display pixel, green display pixel, and blue display pixel arrayed in the horizontal direction, M=1920×3 and N=1080 are satisfied. That is, in the above-described example, M=5760 and N=1080 are satisfied.

The display unit 10 is formed of a front panel on a side of the optical separating unit 30, a rear panel on aside of the illuminating unit 20, a liquid crystal material arranged between the front panel and the rear panel and the like. For convenience of illustration, in FIG. 1, the display unit 10 is represented as one panel.

The illuminating unit 20 illustrated in FIG. 1 is formed of members (not illustrated) such as a light source, a prism sheet, a diffusion sheet, and a light guide plate. Diffused light through the diffusion sheet and the like is emitted from a light-emitting surface 21 toward the rear surface of the display unit 10.

The optical separating unit 30 is provided with an opening 31 forming the structure body. A portion between the opening 31 and the opening 31 is formed as a light shielding unit 32.

Figure 3:
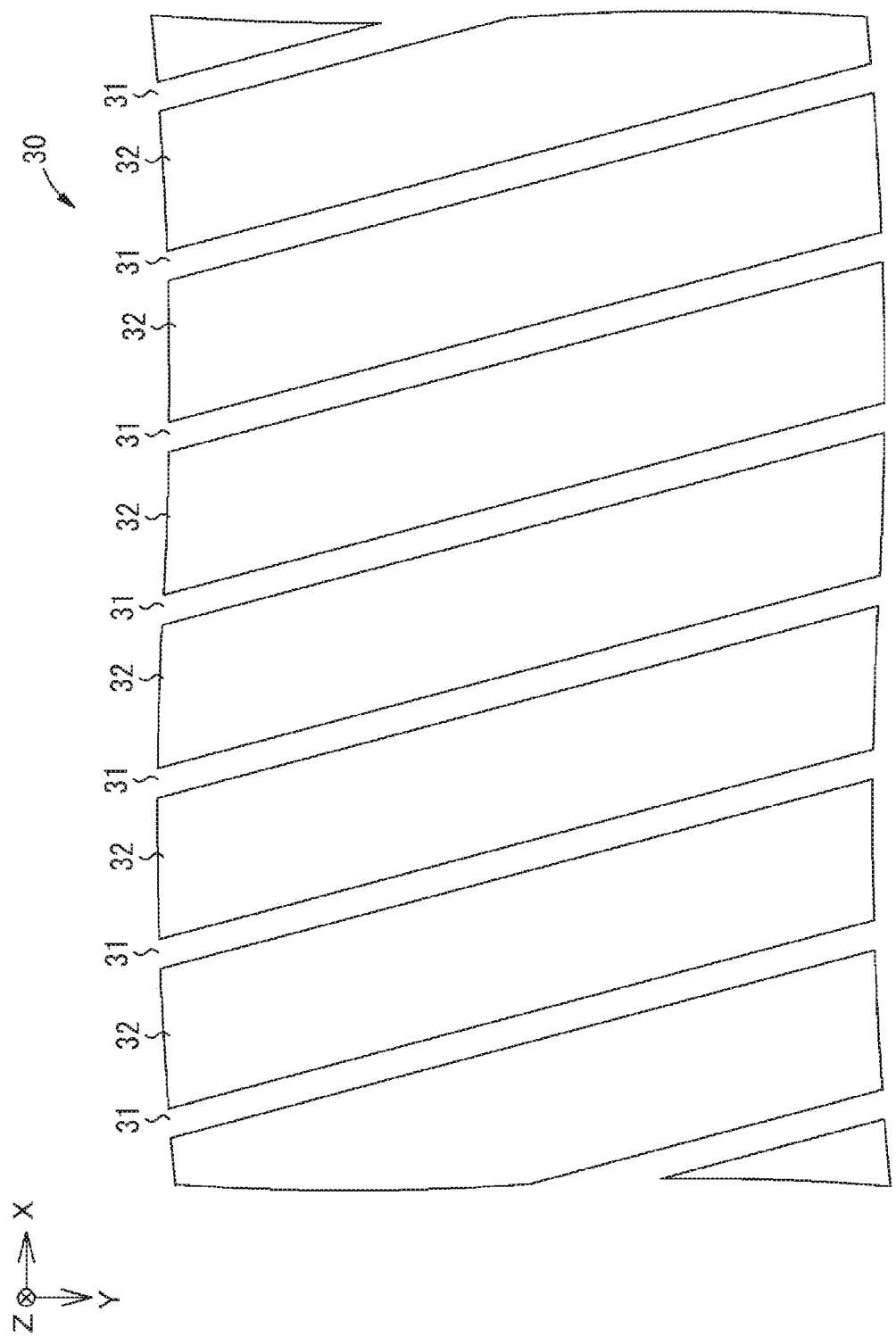
FIG. 3 is a schematic plan view of a part of an optical separating unit for illustrating a structure of the optical separating unit.

FIG. 3 is a schematic plan view of a part of the optical separating unit for illustrating a structure of the optical separating unit.

An interval in a Z direction between the optical separating unit 30 and the display unit 10, a pitch in an X direction between the pixels 12 in the X direction, an angle formed by an extending direction of the opening 31 and a Y direction, and a pitch in the X direction of the openings 31 are set so as to satisfy a condition under which a preferable stereoscopic image may be observed at the observation position determined by the specifications of the display device 1.

Specifically, as illustrated in FIG. 1, it is set such that the observation position $A_{P/4}$ corresponds to the right-eye reference position and the observation position $A_{3P/4}$ corresponds to the left-eye reference position. Meanwhile, for convenience of description, it is hereinafter described assuming that the value of the number of observation positions P is 24, but the present disclosure is not limited to this.

Figure 4:
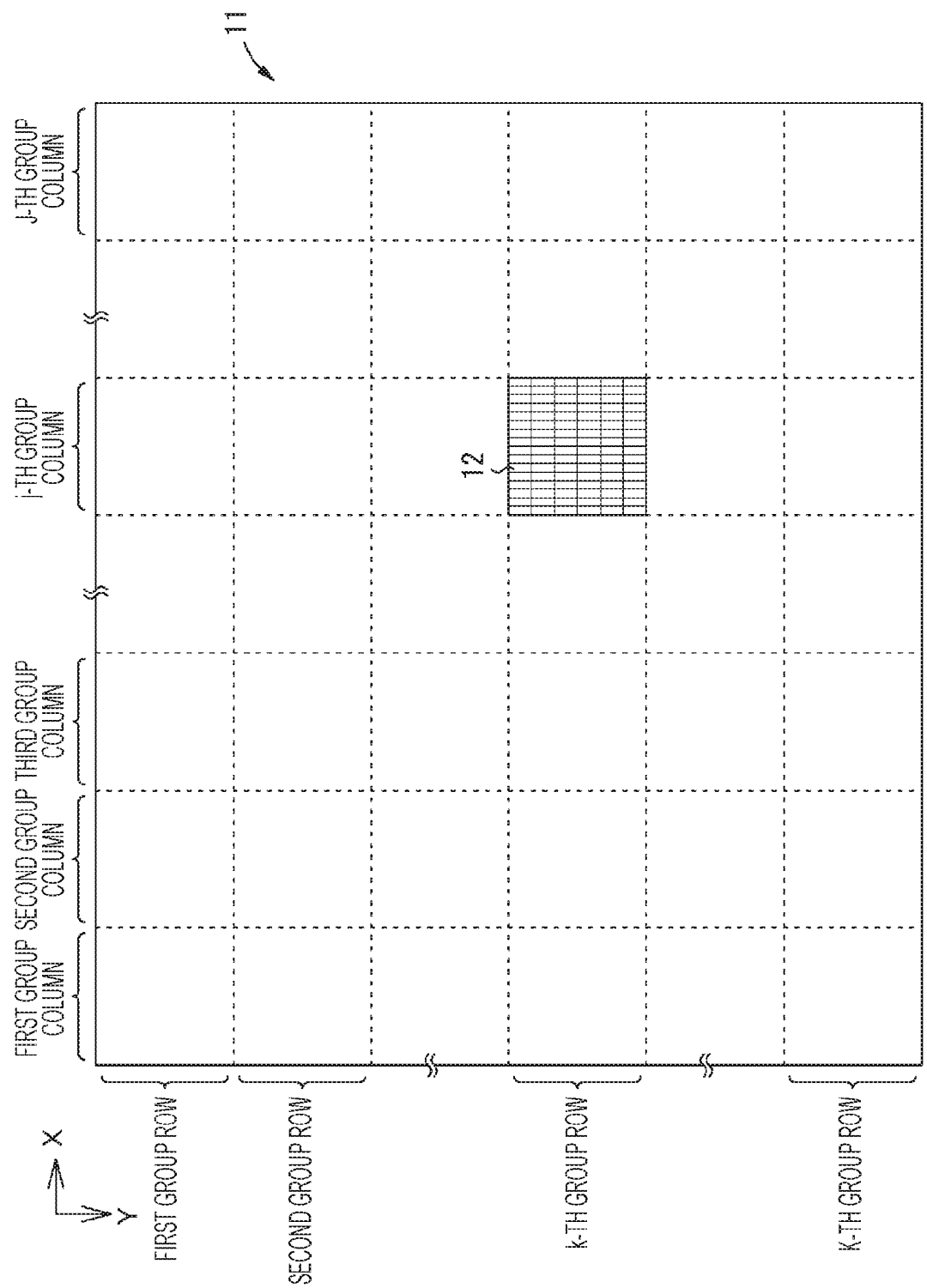
FIG. 4 is a schematic plan view of a display area for illustrating arrangement of a pixel group formed of a plurality of pixels.
Figure 5:
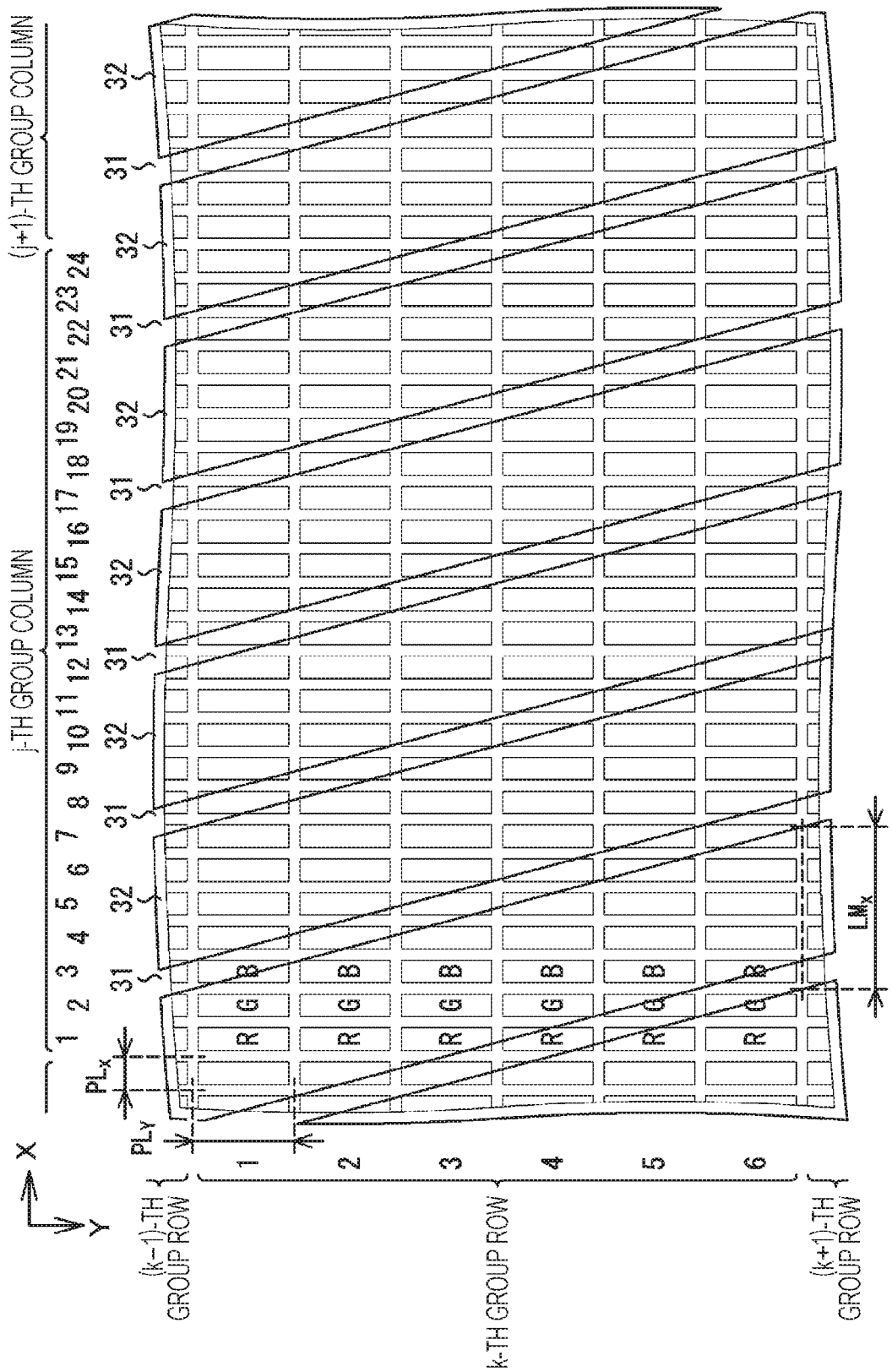
FIG. 5 is a schematic plan view of a part of the optical separating unit and the display area for illustrating an arrangement relationship between an opening of the optical separating unit and the pixels of the pixel group.

With reference to FIGS. 4 and 5, the pixel group formed of a plurality of pixels 12 and the arrangement relationship between the opening 31 of the optical separating unit 30 and the pixels 12 of the pixel group is described.

FIG. 4 is a schematic plan view of the display area for illustrating the arrangement of the pixel group formed of a plurality of pixels. FIG. 5 is a schematic plan view of a part of the optical separating unit and the display area for illustrating the arrangement relationship between the opening of the optical separating unit and the pixel.

The pixel group formed of a plurality of pixels 12 is formed in the display area 11 on the basis of the arrangement relationship between the array of the pixels 12 and the structure body of the optical separating unit 30. There is a case where the pixel group in a j-th group column (where j=1, 2, . . . , J) and in a k-th group row (where k=K, 1, 2, . . . , K) is represented as a pixel group (j, k). In the example of the embodiment, since one pixel group is formed of the pixels 12 arranged in a matrix of 24 pixels in the X direction and six pixels in the Y direction, so that J=5760/24 and K=1080/6.

The pixel group at the reference position is determined by defining a case where the observer is at the optimum viewing position and looks at the front as the reference position.

As described above, the opening 31 forming the structure body of the optical separating unit 30 is arranged at a predetermined angle with respect to the vertical direction, and the array pitch in the horizontal direction of the structure bodies is set to be a non-integral multiple of the array pitch in the horizontal direction of the pixels 12 in the display area 11. Hereinafter, this is described in detail with reference to FIG. 5.

As illustrated in FIG. 5, six openings 31 are arranged in an area occupied by the pixel group (j, k). The arrangement relationship of the opening 31 with respect to the pixel 12 is repeated with a period of a pixel group unit.

In the pixel group (j, k), 24 pixels 12 are arranged in the X direction. If a length in the X direction of the pixel 12 is represented by a reference sign $PL_X$, and the array pitch in the X direction of the openings 31 is represented by a reference sign $LM_X$, $LM_X=(24/5) \times PL_X$ is satisfied. Therefore, the array pitch in the X direction of the openings 31 is a non-integral multiple of the array pitch in the X direction of the pixels 12. If the number of pixels included in the array pitch $LM_X$ in the horizontal direction of the structure bodies of the optical separating unit 30 is represented by a reference sign LX, LX=24/5.

Since the array pitch of the openings 31 in the X direction is set to be a non-integral multiple of the array pitch in the X direction of the pixels 12, even in a case where the observer moves in the X direction, moiré generated by a periodic structure of the pixels 12 and the black matrix 13 and the periodic structure of the openings 31 are not noticeable.

The opening 31 crossing across the pixel 12 in the first row in FIG. 5 is arranged to cross across the pixel 12 in the sixth row with the same positional relationship as that when crossing across the pixel 12 in the first row with respect to the pixel 12 deviated by four pixels in the X direction. If a length in the Y direction of the pixel 12 is represented by a reference sign $PL_Y$, inclination of the structure body of the optical separating unit 30 is $5PL_Y/4PL_X$. Also, if the inclination calculated in a unit of the number of pixels is represented by a reference sign SL, SL=5/4 is satisfied.

Meanwhile, a width in the X direction of the opening 31 is set to be approximately equal to the length $PL_X$ of the pixel 12 in the X direction.

In addition to the fact that the openings 31 is inclined with respect to the pixel, the array pitch in the X direction of the opening 31 such as $LM_X=(24/5) \times PL_X$ described above is set to be a non-integral multiple of the array pitch in the X direction of the pixels 12, so that the value of the number of observation positions P may be set to a large value.

That is, the value of the number of observation positions P is a value of 24 being the least common multiple as an integral value of a value of 1.25 reflecting the relationship of the slope SL=5/4 calculated in a unit of the number of pixels in the opening 31 and a value of 4.8 reflecting the relationship of the number of pixels LX=24/5 included in the array pitch in the X direction of the openings 31. On the other hand, in the configuration in which LX=25/5, for example, the least common multiple as the integer values of a value of 1.25 and a value of 5 is "5", so that the value of the number of observation positions P cannot be made large.

Next, the pixels 12 which display the image observed at each of the observation positions $A_1$ to $A_P$ illustrated in FIG. 1 are described in detail with reference to FIGS. 6 to 10.

Figure 6:
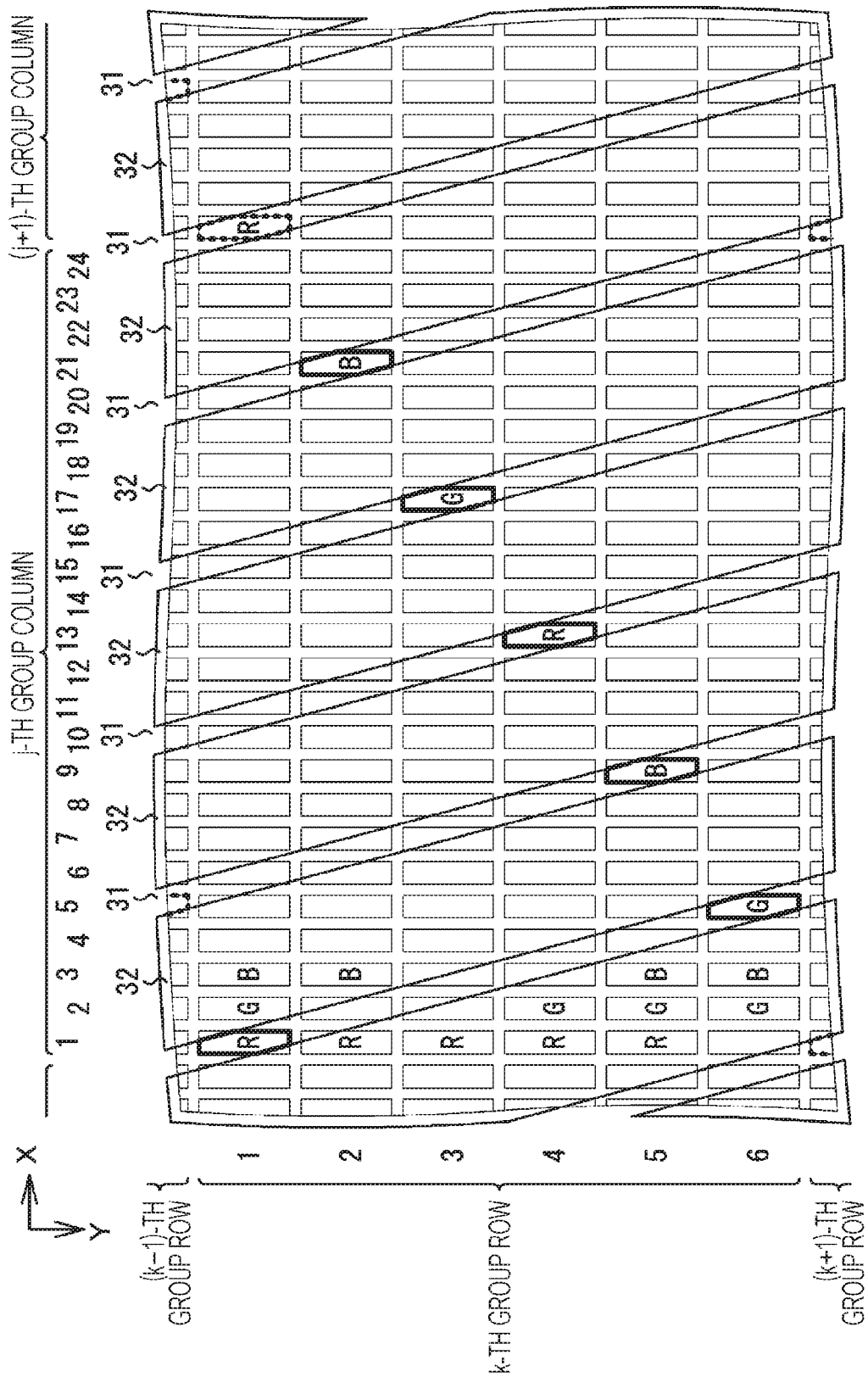
FIG. 6 is a schematic diagram illustrating pixels which display an image to be observed at an observation position $A_1$ in a (j, k) pixel group.

FIG. 6 is a schematic diagram illustrating the pixels which display the image observed at the observation position $A_1$ in the (j, k) pixel group.

If the pixel 12 in an a-th column and a b-th column in the (j, k) pixel group is represented as an [a, b] pixel, the image formed mainly of a [1, 1] pixel, a [5, 6] pixel, a [9, 5] pixel, a [13, 4] pixel, a [17, 3] pixel, and a [21, 2] pixel is observed from the observation position $A_1$ through the opening 31. Meanwhile, in the drawing, the corresponding pixels 12 are enclosed by thick lines. The same applies to other drawings.

Since the optical separating unit 30 is separated from the display unit 10, the pixel 12 observed through the opening 31 also changes if the observation position changes.

Figure 7:
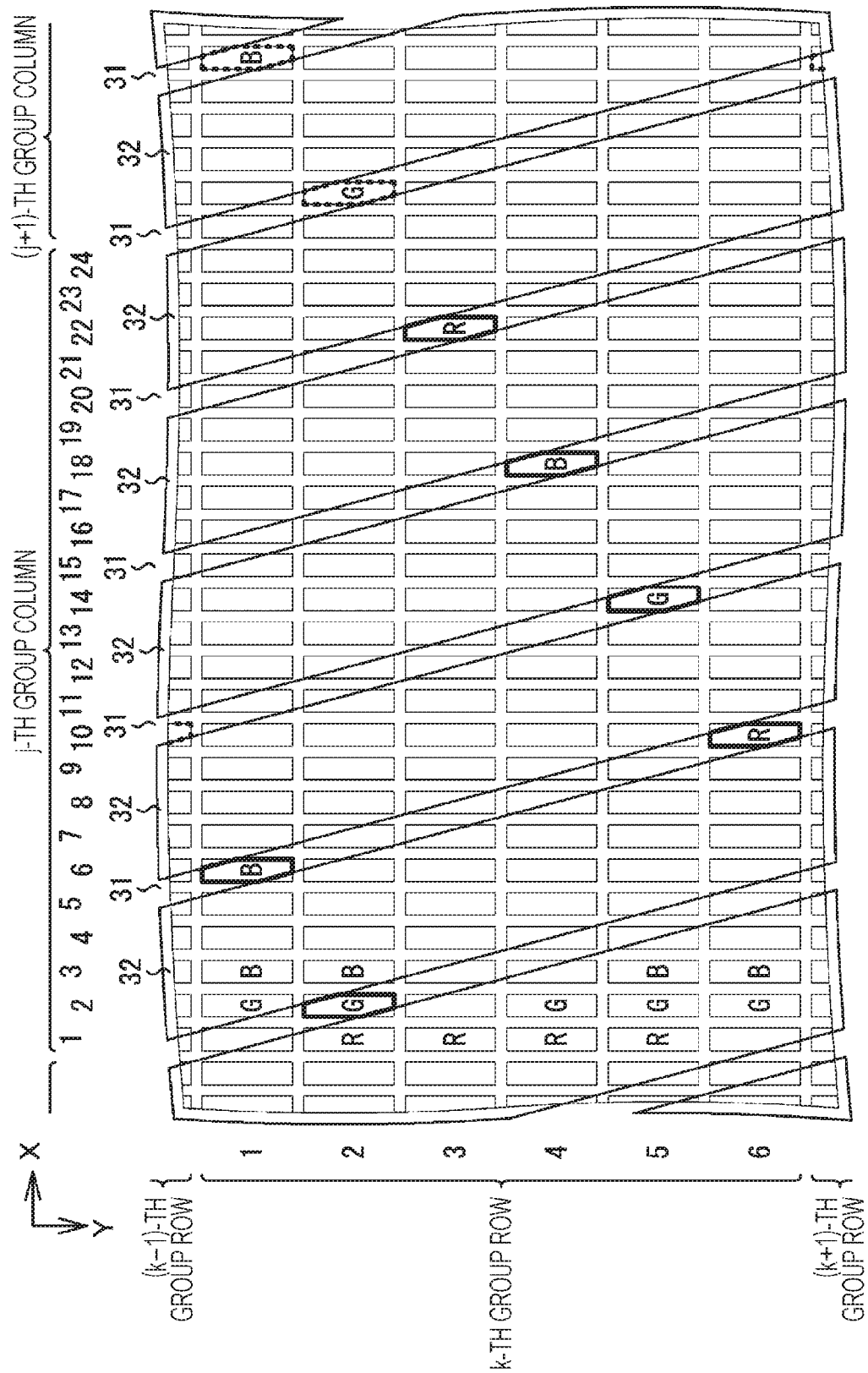
FIG. 7 is a schematic diagram illustrating pixels which display an image to be observed at an observation position $A_2$ in the (j, k) pixel group.
Figure 8:
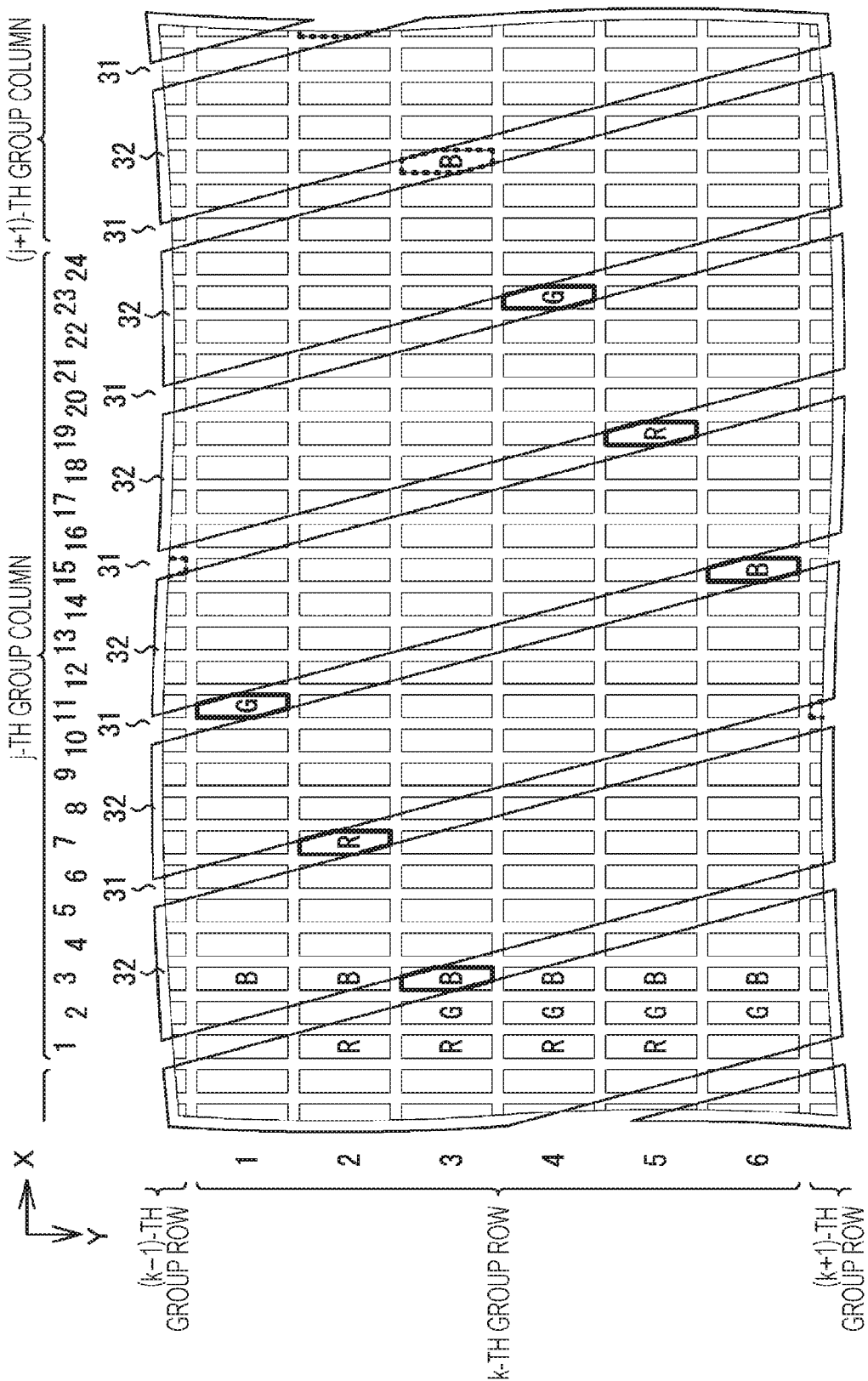
FIG. 8 is a schematic diagram illustrating pixels which display an image to be observed at an observation position $A_3$ in the (j, k) pixel group.

FIG. 7 is a schematic diagram illustrating the pixels which display the image observed at the observation position $A_2$ in the (j, k) pixel group. Also, FIG. 8 is a schematic diagram illustrating the pixels which display the image observed at the observation position $A_3$ in the (j, k) pixel group.

The image formed mainly of a [2, 2] pixel, a [6, 1] pixel, a [10, 6] pixel, a [14, 5] pixel, a [18, 4] pixel, and a [22, 3] pixel is observed from the observation position $A_2$ through the opening 31. Also, the image formed mainly of a [3, 3] pixel, a [7, 2] pixel, a [11, 1] pixel, a [15, 6] pixel, a [19, 5] pixel, and a [23, 4] pixel is observed from the observation position $A_3$ through the opening 31.

Figure 9:
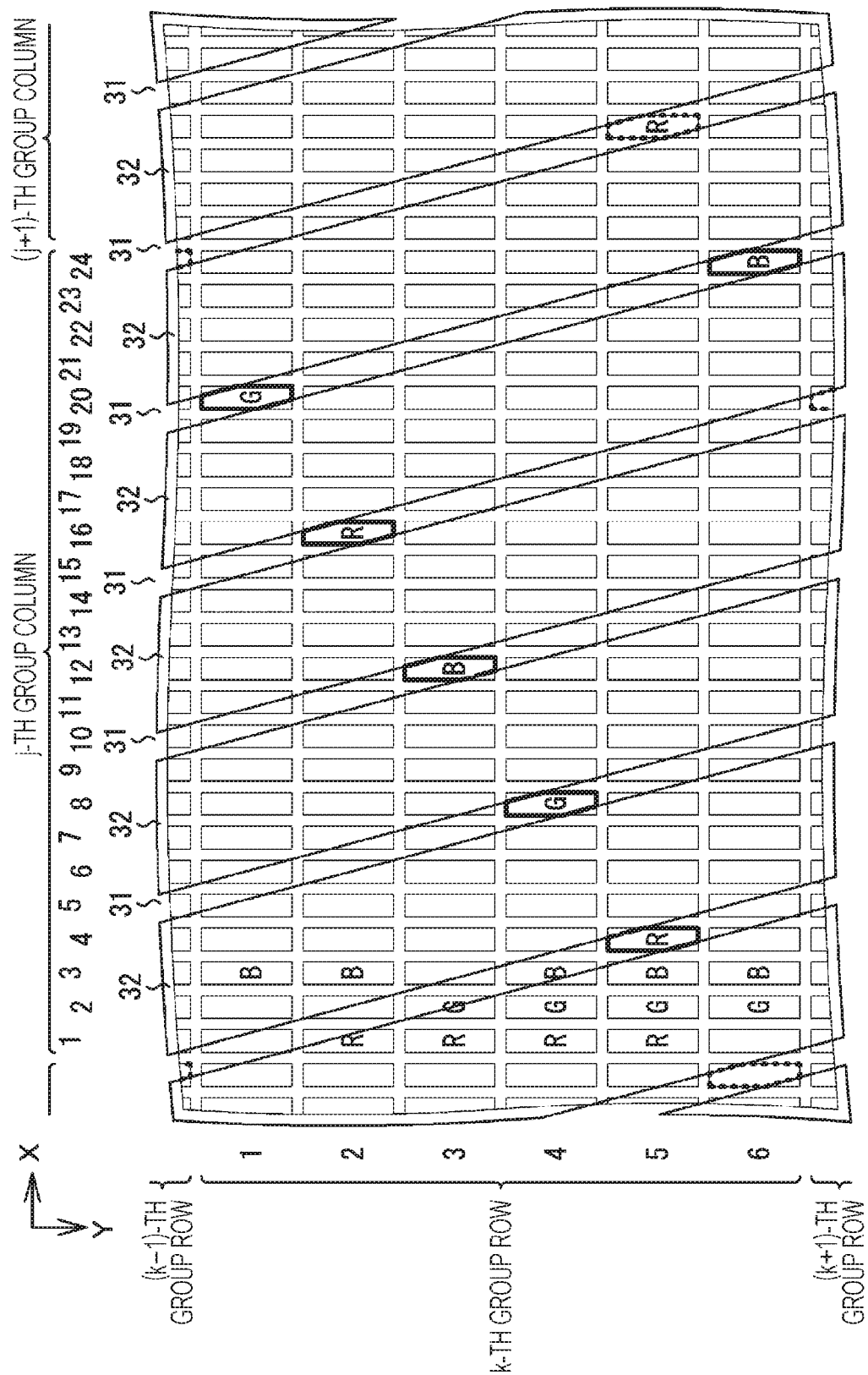
FIG. 9 is a schematic diagram illustrating pixels which display an image observed at an observation position $A_P$ (=$A_{24}$) in the (j, k) pixel group.

FIG. 9 is a schematic diagram illustrating the pixels which display the image observed at the observation position $A_P$ $(=A_{24})$ in the (j, k) pixel group.

The image mainly formed of a [4, 5] pixel, a [8, 4] pixel, a [12, 3] pixel, a [16, 2] pixel, a [20, 1] pixel, and a [24, 6] pixel is observed from the observation position $A_P$ $(=A_{24})$ through the opening 31.

Meanwhile, due to periodicity of the arrangement of the pixels 12 and the openings 31, the similar relationship is repeated also out of the observation position $A_1$ to $A_P$. For example, as illustrated in FIG. 1, the arrangement relationship similar to that at the observation position $A_P$ is established at a position deviated from the observation position $A_1$ in a +X direction, and the arrangement relationship similar to that at the observation position $A_1$ is established at a position deviated from the observation position $A_P$ in a −X direction.

Figure 10:
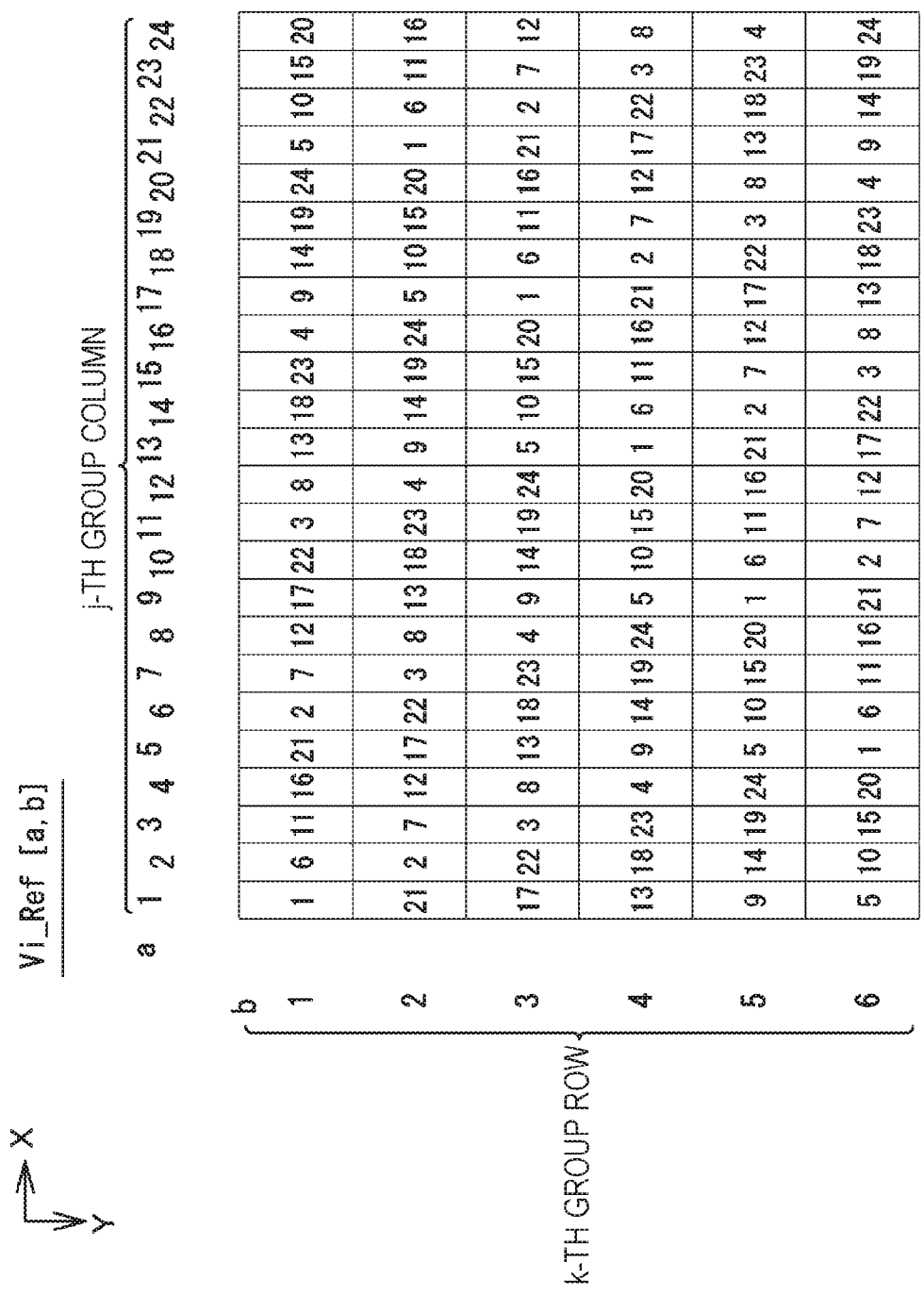
FIG. 10 is a schematic diagram for illustrating pixels which display images corresponding to the observation positions $A_1$ to $A_P$ (=$A_{24}$) in the (j, k) pixel group.

Summarizing the results described above, in the (j, k) pixel group, the pixels 12 which display the images corresponding to the observation point $A_1$ to the observation position $A_P$ are represented as illustrated in FIG. 10.

FIG. 10 is a schematic diagram for illustrating the pixels which display the images corresponding to the observation positions $A_1$ to $A_P$ $(=A_{24})$ in the (j, k) pixel group.

A numerical value illustrated in FIG. 10 is referred to as the reference viewpoint number in the pixel 12. The reference viewpoint number of the pixel 12 in the a-th column and the b-th column in the (j, k) pixel group is represented as Vi-Ref [a, b].

Meanwhile, Vi_Ref [a, b] may be calculated as follows. When the remainder obtained by dividing a dividend by a divisor is represented as (dividend mod divisor), Vi [a, b]=((a−b/SL) mod LX)·(P/LX) is satisfied, and if 1≤Vi[a, b]≤(P−1), Vi_Ref[a, b]=Vi[a, b], and if Vi[a, b]=0, Vi_Ref [a, b]=P.

In the above-described example, since LX=4.8, SL=5/4, and P=24, it may be obtained as Vi [a, b]=((a−4b/5) mod 4.8)·(24/4.8).

The driving unit 100 is provided with a table storing the numerical values illustrated in FIG. 10 as the table storing the correspondence relationships between the pixels 12 forming the pixel group and the observation positions $A_1$ to $A_P$. Herein, it is described assuming that the table storing the correspondence relationship between the pixels 12 forming the pixel group and the observation positions $A_1$ to $A_P$ is commonly set in each pixel group.

As described above, the display device 1 is set such that the observation position $A_{P/4}$ corresponds to the right-eye reference position and the observation position $A_{3P/4}$ corresponds to the left-eye reference position. In the embodiment, the right-eye reference position falls between the observation positions $A_6$ and $A_7$. Also, the left-eye reference position falls between the observation positions $A_{18}$ and $A_{19}$.

The driving unit 100 illustrated in FIG. 1 controls the image to be displayed on the display unit 10 such that the right-eye image is observed at the observation positions $A_1$ to $A_{P/2}$ and the left-eye image is observed at the observation positions $A_{(P/2)+1}$ to $A_P$ when the observer's eyes are at the predetermined reference positions.

The right-eye image data $DR_{(1,1)}$ to $DR_{(M,N)}$ for displaying the right-eye image, and the left-eye image data $DL_{(1,1)}$ to $DL_{(M,N)}$ for displaying the left-eye image are supplied to the driving unit 100 corresponding to the pixels $12_{(1,1)}$ to $12_{(M,N)}$, respectively.

The driving unit 100 corrects the viewpoint number corresponding to the pixel on the basis of the reference viewpoint number determined by the correspondence relationship between the pixels 12 forming the pixel group and the observation positions $A_1$ to $A_P$ and the position information from the position detecting unit 40, thereby controlling the image to be displayed on the display unit 10.

First Embodiment

Figure 11:
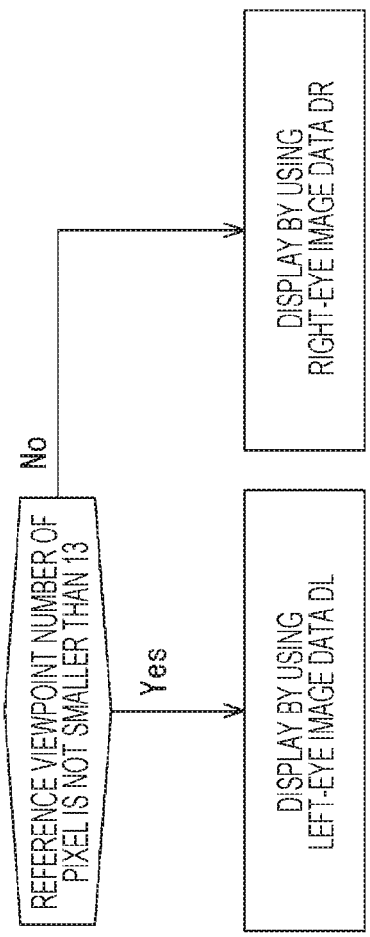
FIG. 11 is a schematic flowchart for illustrating which of left-eye image data and right-eye image data is selected for each pixel to display in a case where an image observer observes the image at a reference position in design.

A first embodiment is hereinafter described. FIG. 11 is a schematic flowchart for illustrating which of left-eye image data and right-eye image data is selected for each pixel to display in a case where an image observer observes an image at a reference position in design.

Figure 12:
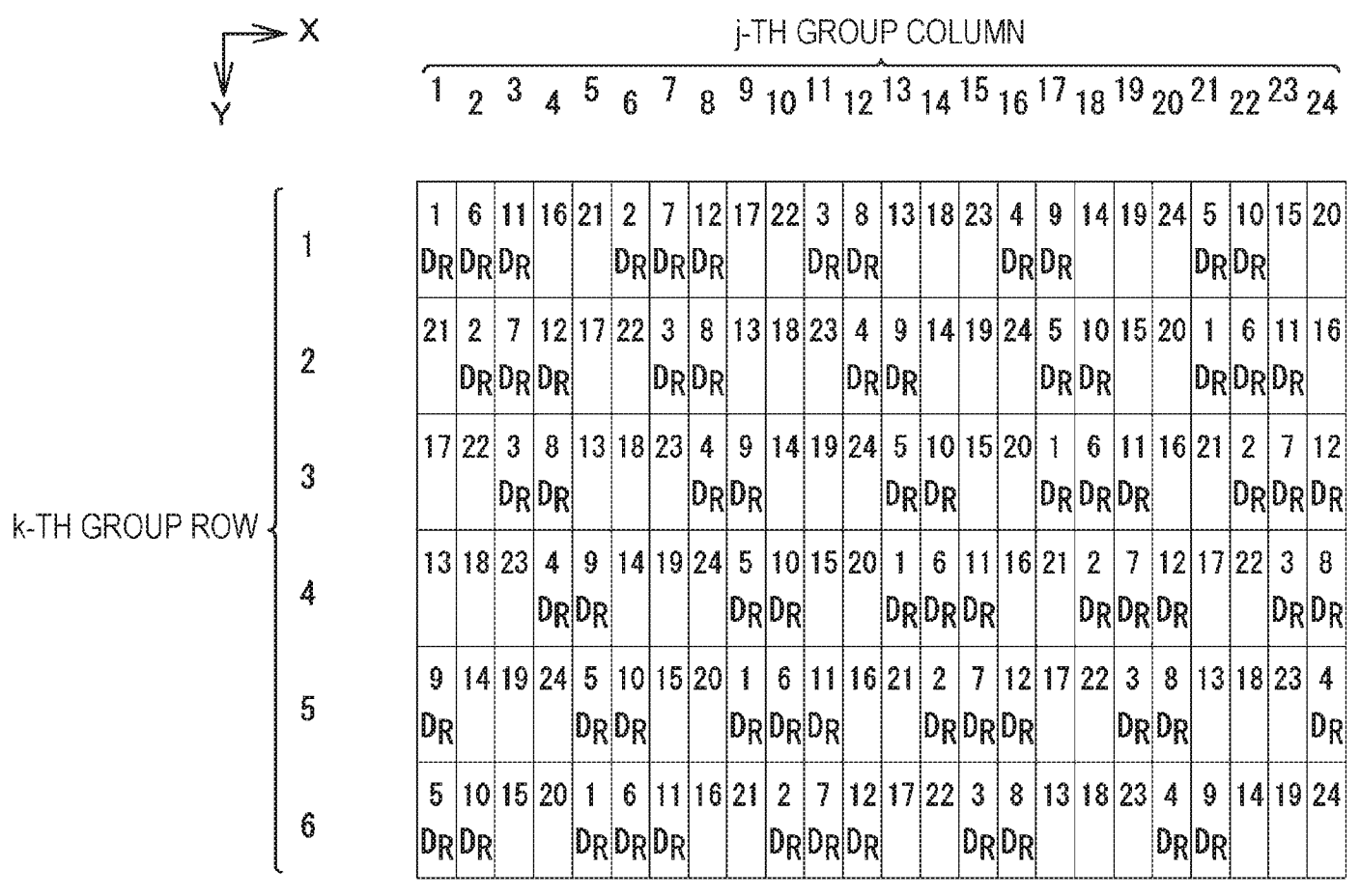

According to the flowchart in FIG. 11, pixels 12 of reference viewpoint numbers 1 to 12 are driven on the basis of the right-eye image data. Specifically, when the reference viewpoint number of a pixel $12_{(m,n)}$ is 1 to 12, the pixel $12_{(m,n)}$ is driven on the basis of data $DR_{(m,n)}$. FIG. 12 is a view for illustrating the pixels which display on the basis of the right-eye image data in a (j, k) pixel group in a case where the image observer observes the image at the reference position in design.

Figure 13:
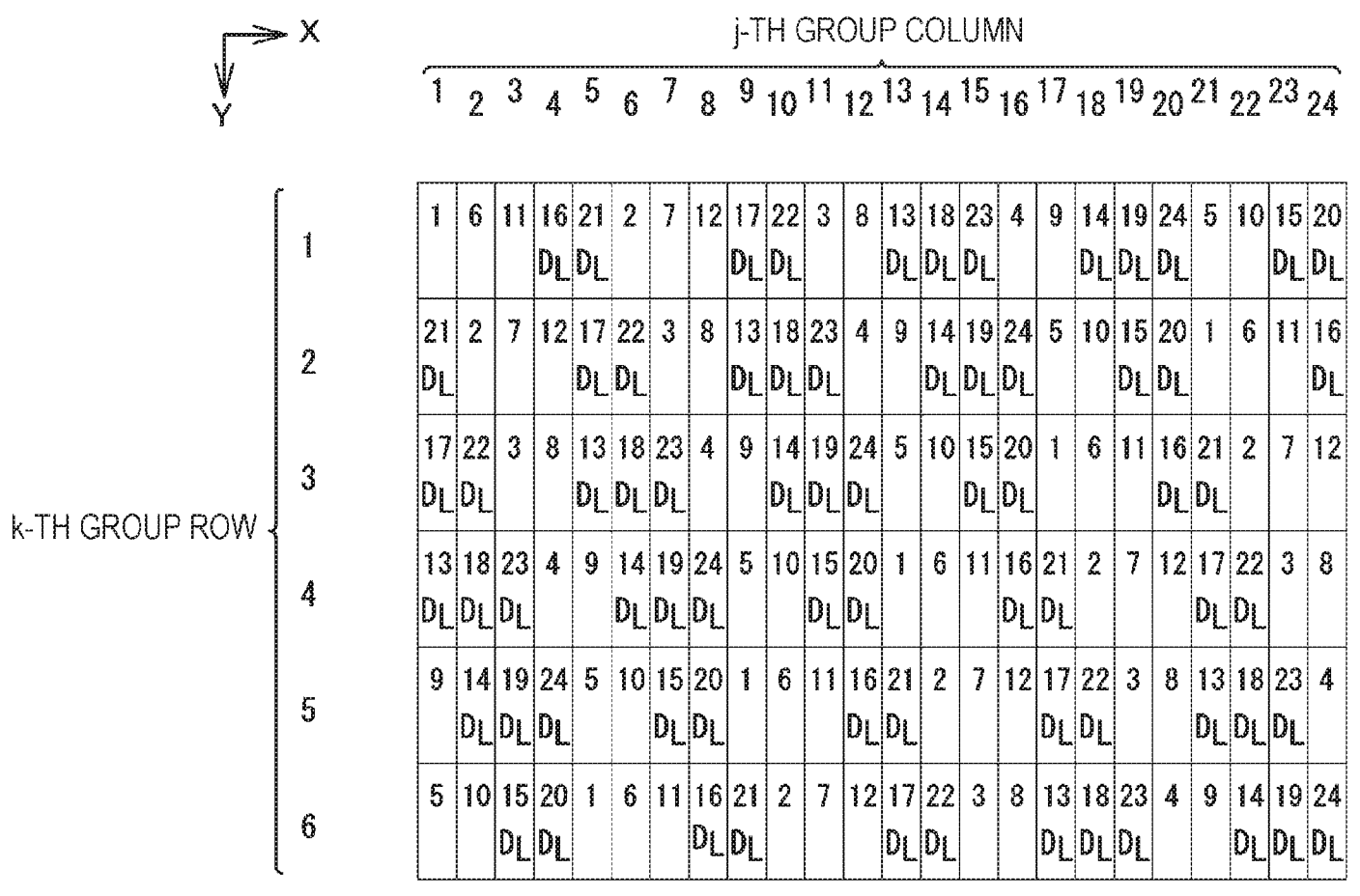

Also, the pixels 12 of the reference viewpoint numbers 12 to 24 are driven on the basis of the left-eye image data. Specifically, when the reference viewpoint number of the pixel $12_{(m,n)}$ is 12 to 24, the pixel $12_{(m,n)}$ is driven on the basis of data $DL_{(m,n)}$. FIG. 13 is a view for illustrating the pixels which display on the basis of the left-eye image data in the (j, k) pixel group in a case where the image observer observes the image at the reference position in design.

Figure 14:
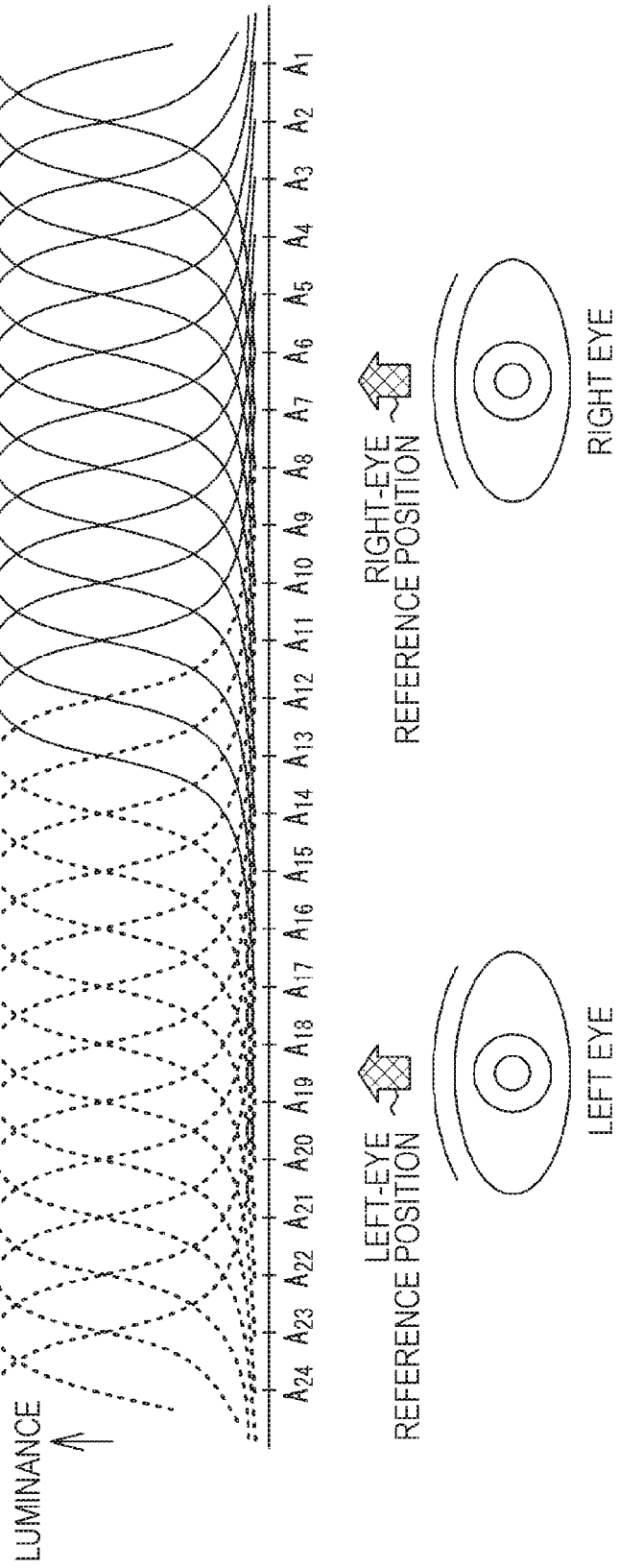
FIG. 14 is a schematic diagram for illustrating a state when the image observer observes the image at the reference position in design.

FIG. 14 is a schematic diagram for illustrating a state in which the image observer observes the image at the reference position in design.

All the pixels mainly observed at each of the observation positions $A_1$ to $A_{12}$ are driven by the right-eye image data DR. Therefore, the left-eye image is extremely rarely mixed in the image observed by the right eye. Similarly, all the pixels 12 mainly observed at each of the observation positions $A_{13}$ to $A_{24}$ are driven by the left-eye image data DL. Therefore, the right-eye image is extremely rarely mixed in the image observed by the left eye. Therefore, it is possible to observe the image with small crosstalk.

Next, in order to facilitate understanding of the present disclosure, a state in which the image observer observes the image at a position deviated from the reference position in design without controlling a display unit 10 is described.

Figure 15:
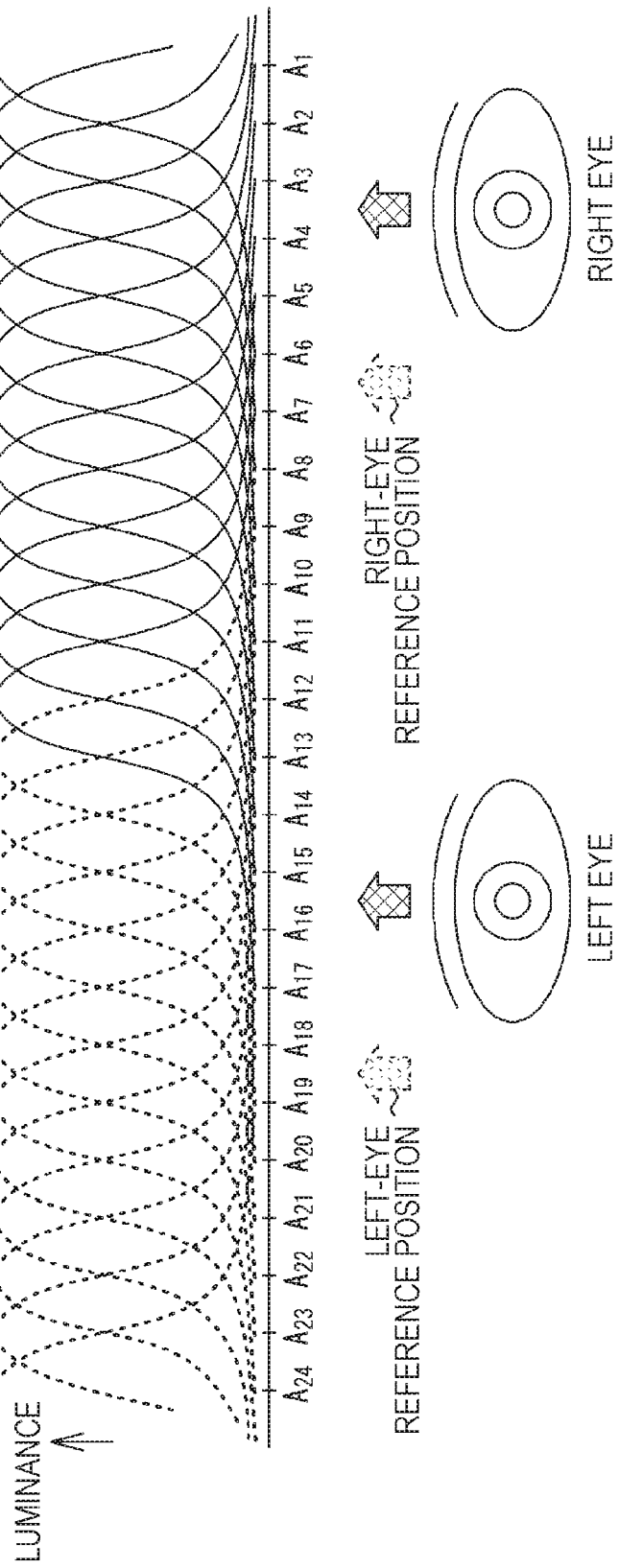
FIG. 15 is a schematic diagram for illustrating a state in which the image observer observes the image at a position deviated in a +X direction from the reference position in design.

FIG. 15 is a schematic diagram for illustrating a state in which the image observer observes the image at a position deviated in a +X direction from the reference position in design.

In this example, the right-eye reference position falls between the observation positions $A_3$ and $A_4$. Also, the left-eye reference position falls between the observation positions $A_{15}$ and $A_{16}$.

As is clear as compared with FIG. 14, in this state, a degree of mixture of the right-eye image in the image observed with the left eye increases. Meanwhile, although not illustrated in FIG. 15, the degree of mixture of the left-eye image in the image observed with the right eye also increases.

Figure 16:
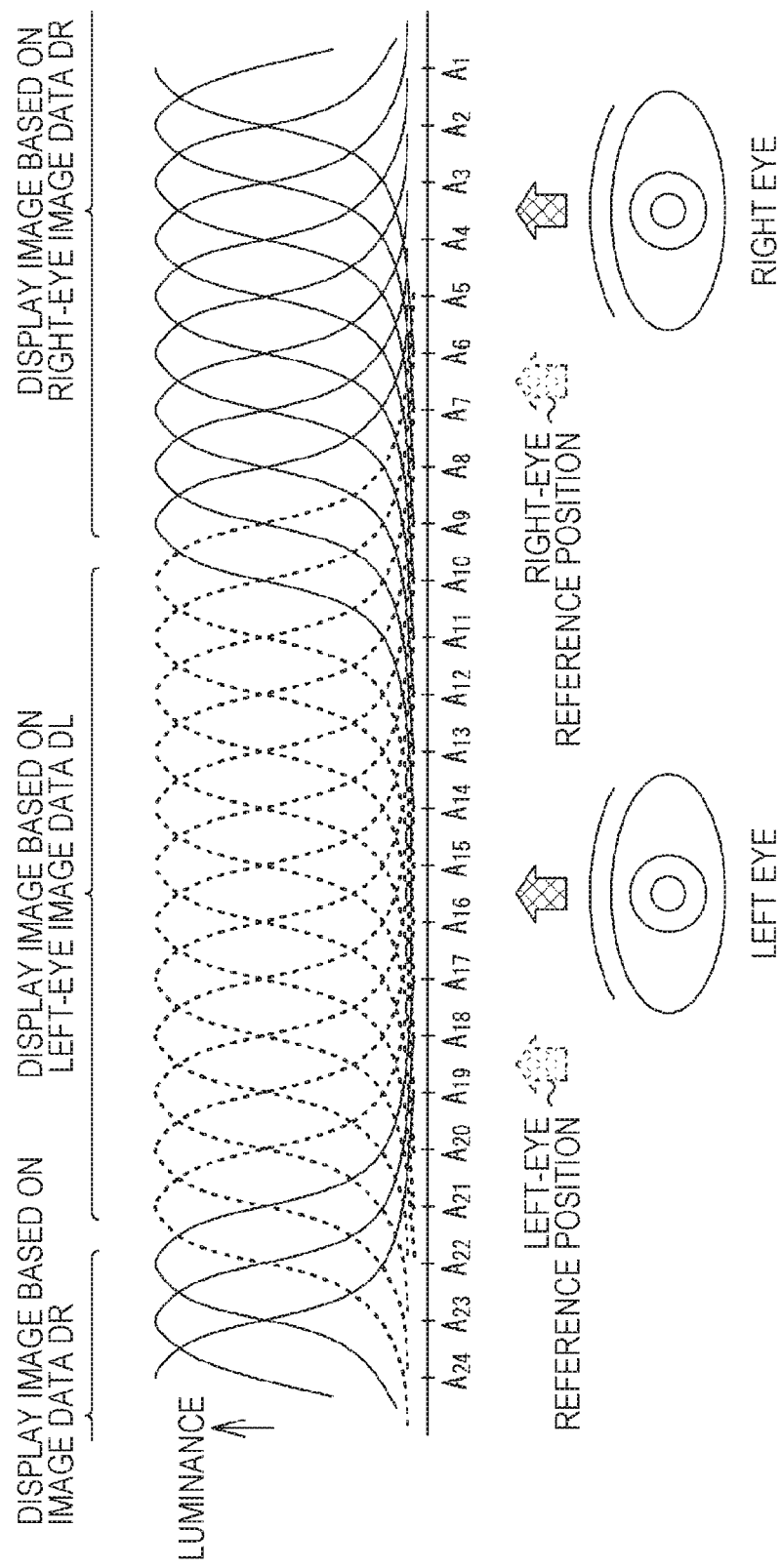
FIG. 16 is a schematic diagram for illustrating operation of correcting a viewpoint number of the pixel and an effect associated with the operation in a case where the image observer observes the image at a position deviated in the +X direction from the reference position in design.

In this case, as illustrated in FIG. 16, if the left-eye image is observed at the observation positions $A_{10}$ to $A_{21}$ and the right-eye image is observed at the observation positions $A_{22}$ to $A_{24}$ and $A_1$ to $A_9$, an observation state similar to that in FIG. 14 is realized and the image with small crosstalk may be observed. In other words, the image to be displayed on the display unit 10 may be controlled such that the image is observed in a state similar to that when the observer's eyes are at predetermined reference positions when the observer's eyes are at positions deviated from the predetermined reference position.

Therefore, in the embodiment, the display unit 10 is controlled when the image observer observes the image at the positions deviated from the reference positions in design. A driving unit 100 controls the image to be displayed on the display unit 10 on the basis of a table storing a correspondence relationship between the pixels 12 forming the pixel group and the observation positions $A_1$ to $A_P$ and position information from a position detecting unit 40. More specifically, the driving unit 100 corrects the viewpoint number of the pixel 12 on the basis of the reference viewpoint number and the position information from the position detecting unit 40 and selects any one of the right-eye image data DR and the left-eye image data DL on the basis of a value of the corrected viewpoint number to drive the pixel 12. An example of operation when displaying as illustrated in FIG. 16 is described with reference to FIG. 17.

Figure 17:
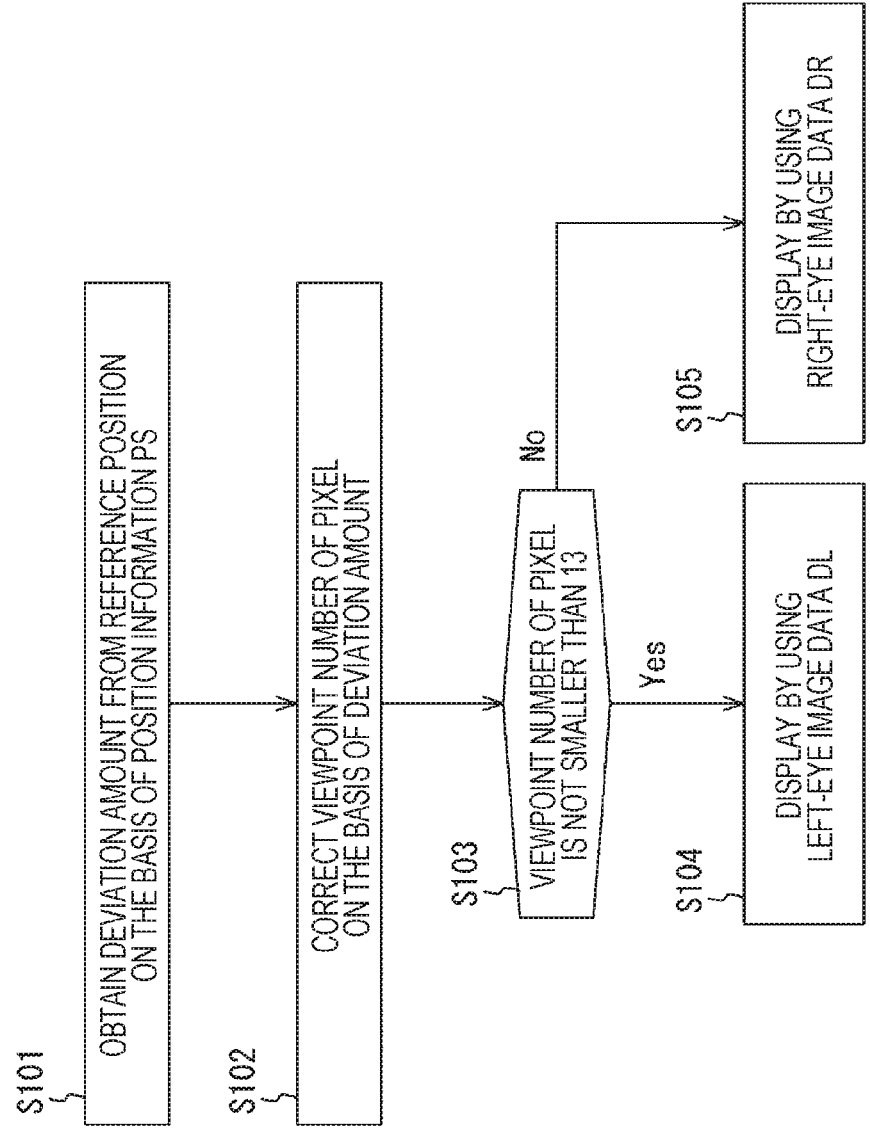
FIG. 17 is a schematic flowchart for illustrating the operation when correcting the viewpoint number of the pixel to display.

FIG. 17 is a schematic flowchart for illustrating the operation when displaying while correcting the viewpoint number of the pixel.

The driving unit 100 obtains a deviation amount from the reference position on the basis of position information PS (step S101). For example, it is sufficient to obtain the position information of the observer's eye on the basis of head tracking technology, face tracking technology and the like and obtain difference between the same and the reference position.

Next, the viewpoint number of the pixel 12 is corrected on the basis of the deviation amount (step S102).

In a case where the observation position is deviated as illustrated in FIG. 16, basically, it is corrected by subtracting 3 from the reference viewpoint number. More specifically, if the corrected viewpoint number is represented as Vi_Mod [a, b], it is sufficient to perform operation such as Vi_Mod [a, b]=((Vi_Ref [a, b]−4) mod 24)+1). FIG. 18 illustrates the corrected viewpoint number.

Thereafter, on the basis of the corrected viewpoint number, image data to be used when each pixel displays is selected for displaying (steps S103, S104, and S105).

Figure 19:
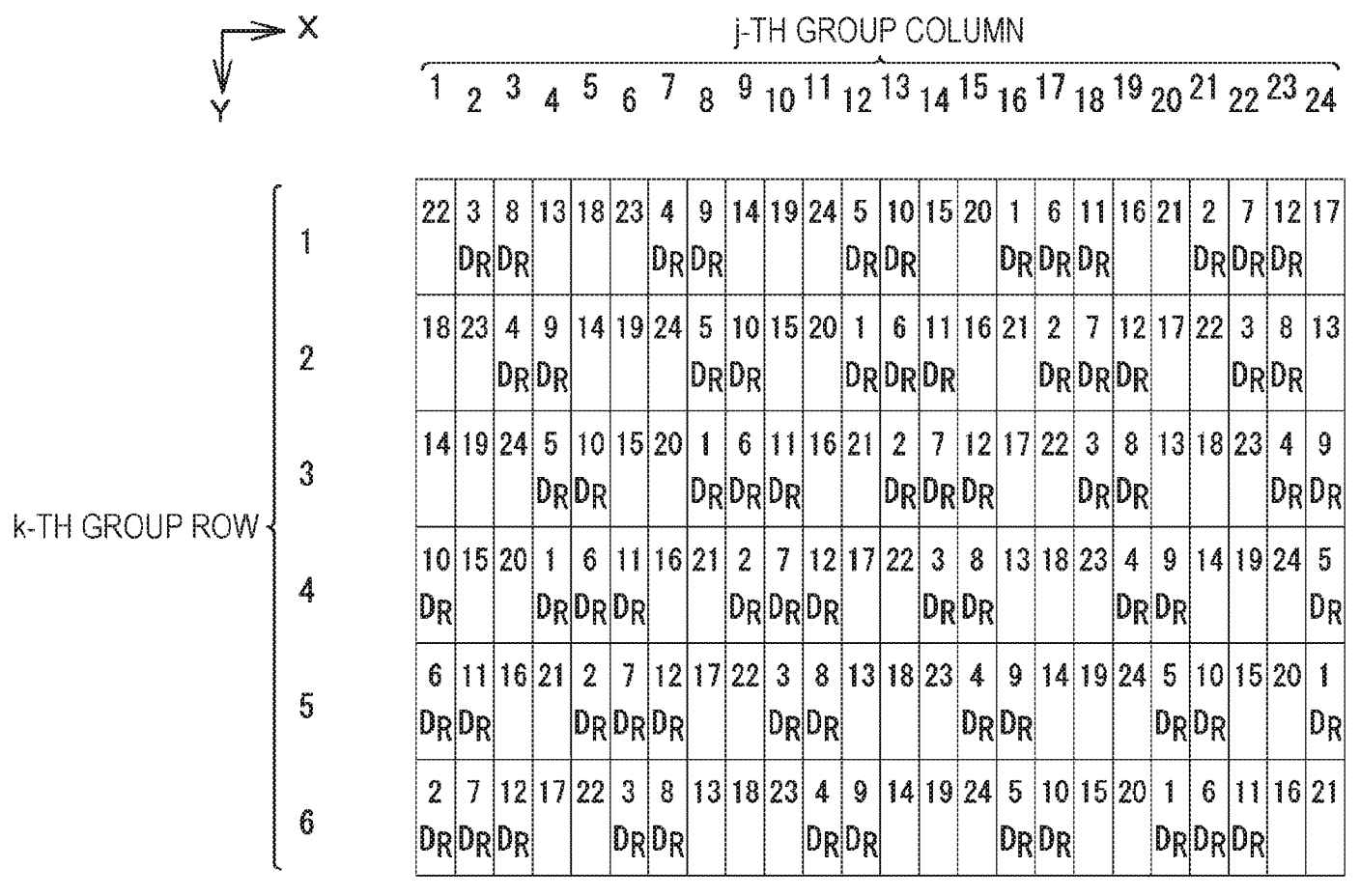
Figure 20:
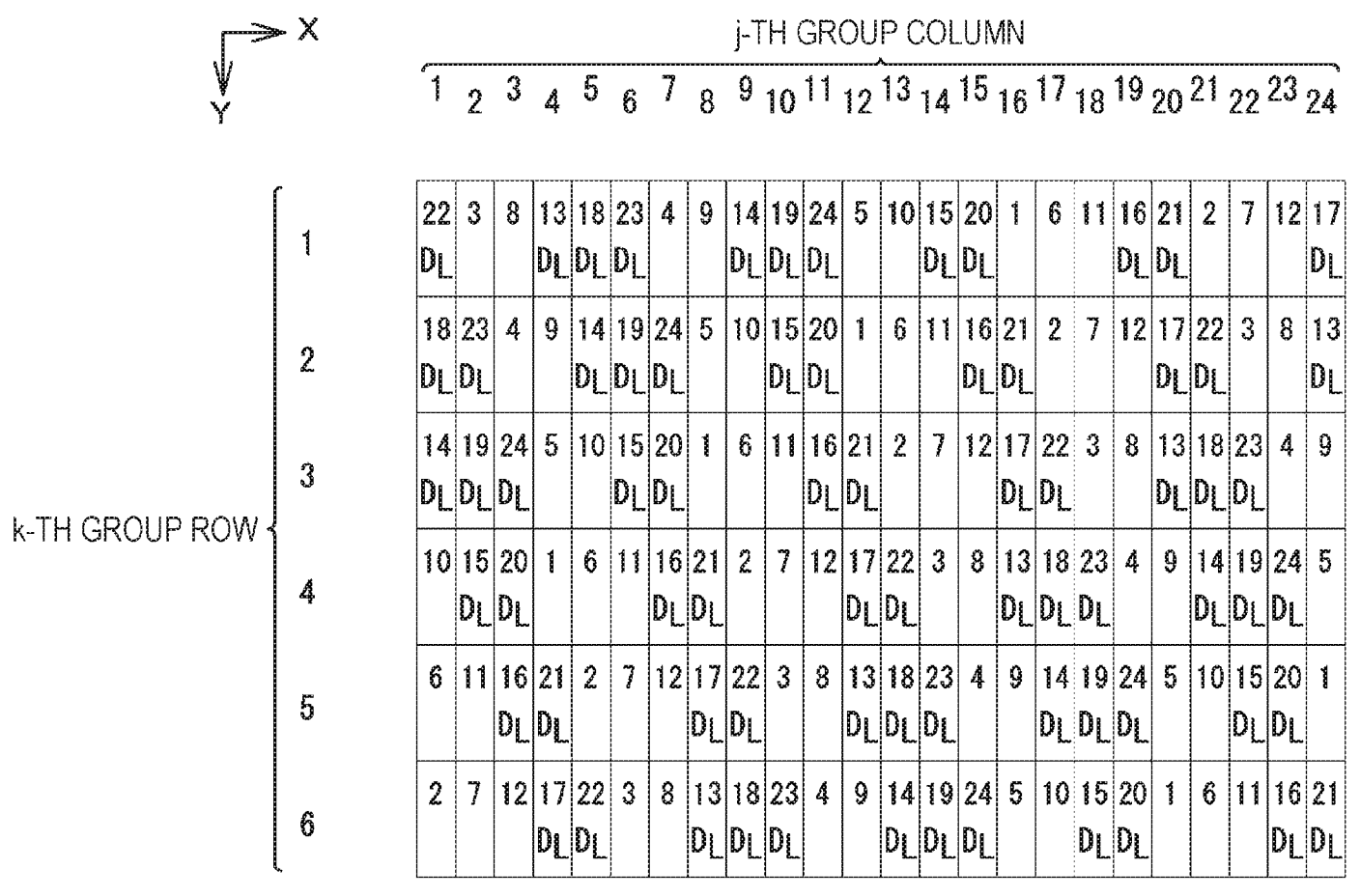

The pixels 12 with the corrected viewpoint numbers 1 to 12 are driven on the basis of the right-eye image data DR. Also, the pixels 12 with the corrected viewpoint numbers 12 to 24 are driven on the basis of the left-eye image data DL. FIG. 19 is a view for illustrating the pixels 12 which display on the basis of the right-eye image data in the (j, k) pixel group in a case where the observation position is deviated as illustrated in FIG. 16. Also, FIG. 20 is a view for illustrating the pixels which display on the basis of the left-eye image data in the (j, k) pixel group in a case where the observation position is deviated as illustrated in FIG. 16.

By performing the above-described operation, even if the observer's position is deviated from the reference position, the observation state similar to that in FIG. 14 is obtained, and the image with small crosstalk may be observed.

Next, the operation in a case of deviation in a −X direction from the reference position in design is briefly described with reference to FIG. 21.

Figure 21:
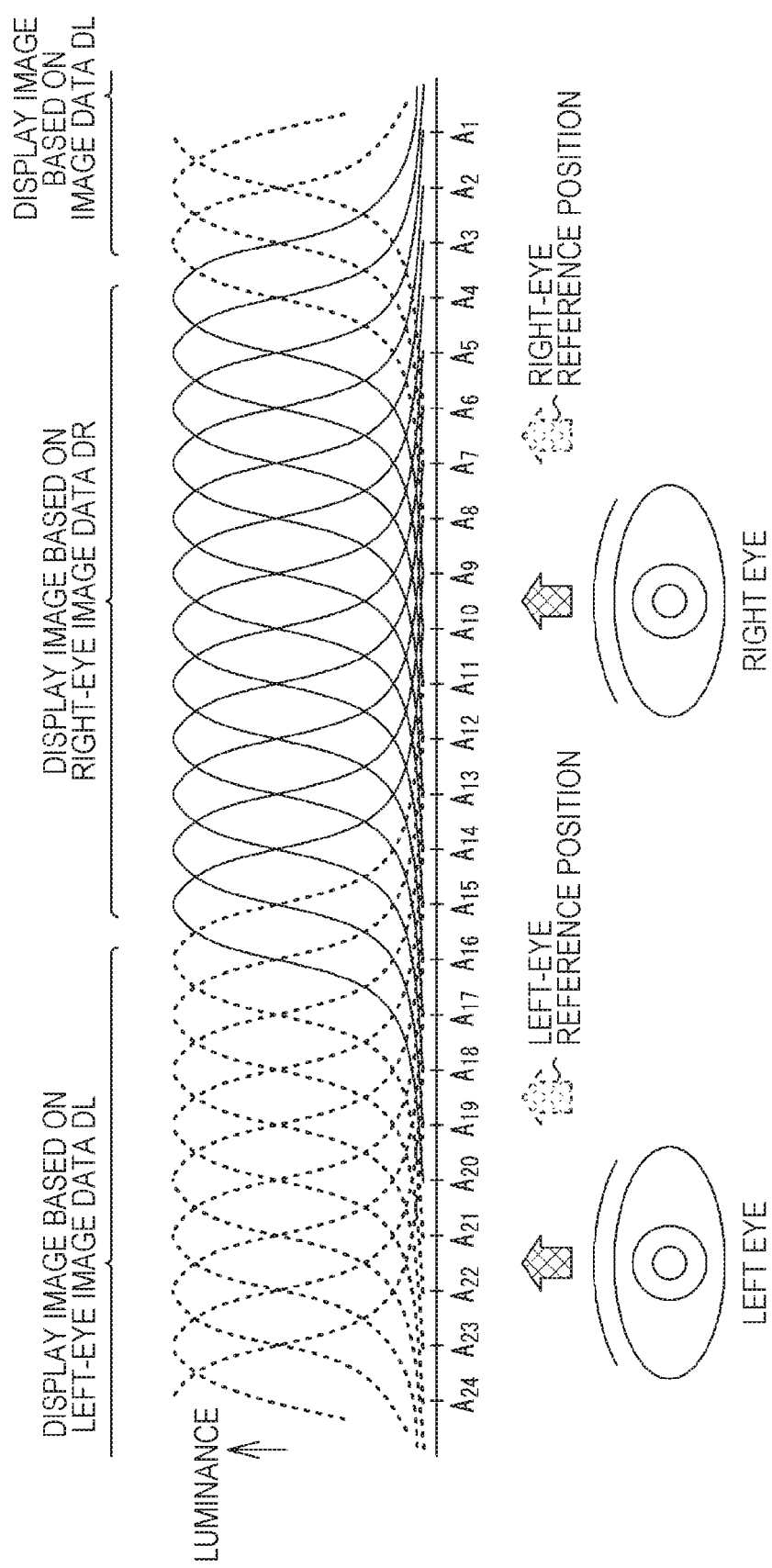
FIG. 21 is a schematic diagram for illustrating operation of correcting the viewpoint number of the pixel and an effect associated with the operation in a case where the image observer observes the image at a position deviated in a −X direction from the reference position in design

FIG. 21 is a schematic diagram for illustrating the operation of correcting the viewpoint number of the pixel and an effect associated with the same in a case where the image observer observes the image at the position deviated in the −X direction from the reference position in design.

In this case, basically, it is corrected to add 3 to the reference viewpoint number. More specifically, Vi_Mod [a, b]=((Vi_Ref [a, b]+2) mod 24)+1) may be performed.

The operation of a display device according to the first embodiment is heretofore described.

Second Embodiment

In the first embodiment, it is configured such that the pixels 12 whose corrected viewpoint numbers are 1 to 12 are driven on the basis of the right-eye image data and the pixels 12 whose corrected viewpoint numbers are 12 to 24 are driven on the basis of the left-eye image data. A second embodiment is characterized in that a driving unit 100 further multiplies a coefficient according to a value of a viewpoint number by image data DR and DL to drive a pixel 12.

Figure 22:
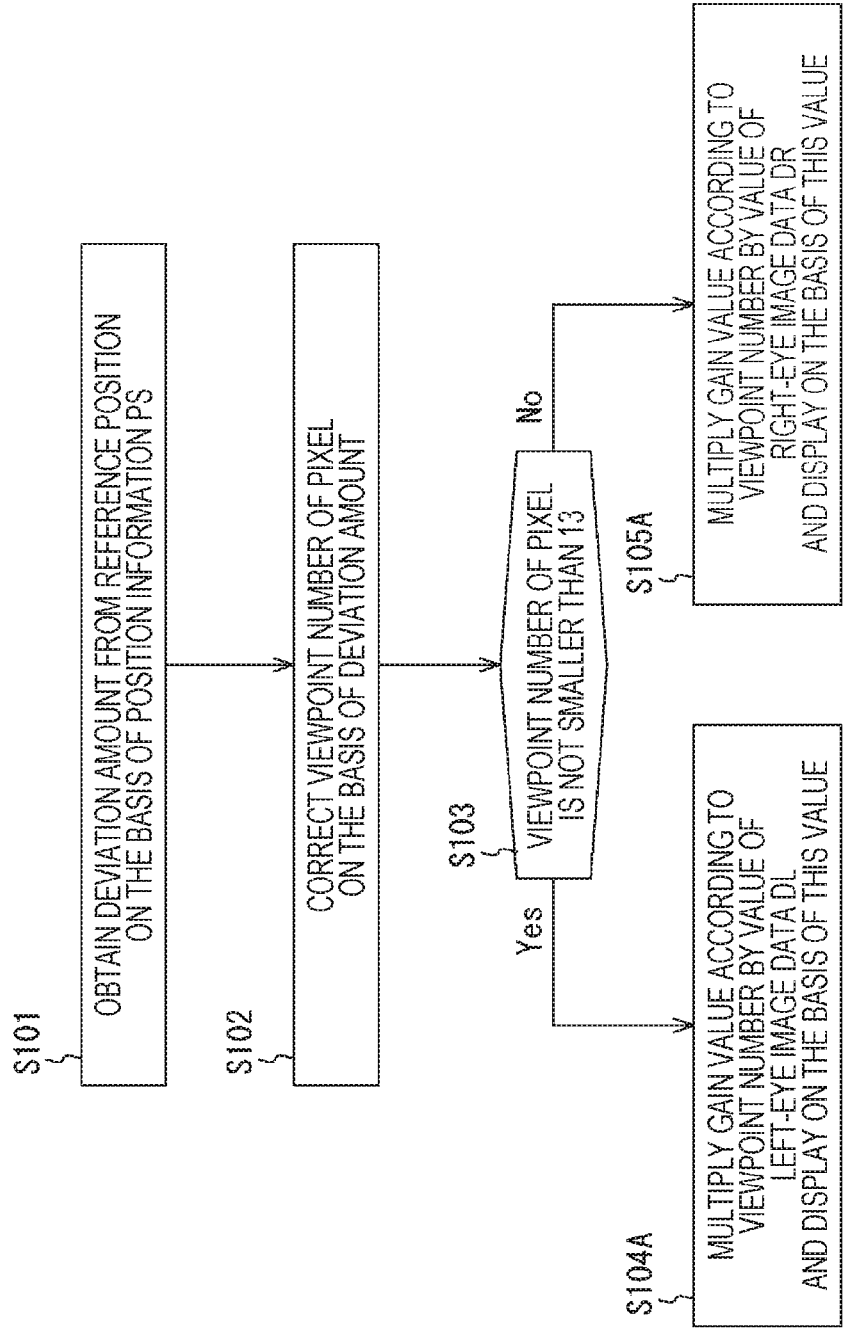
FIG. 22 is a schematic flowchart for illustrating operation when displaying in a second embodiment.
Figure 23:
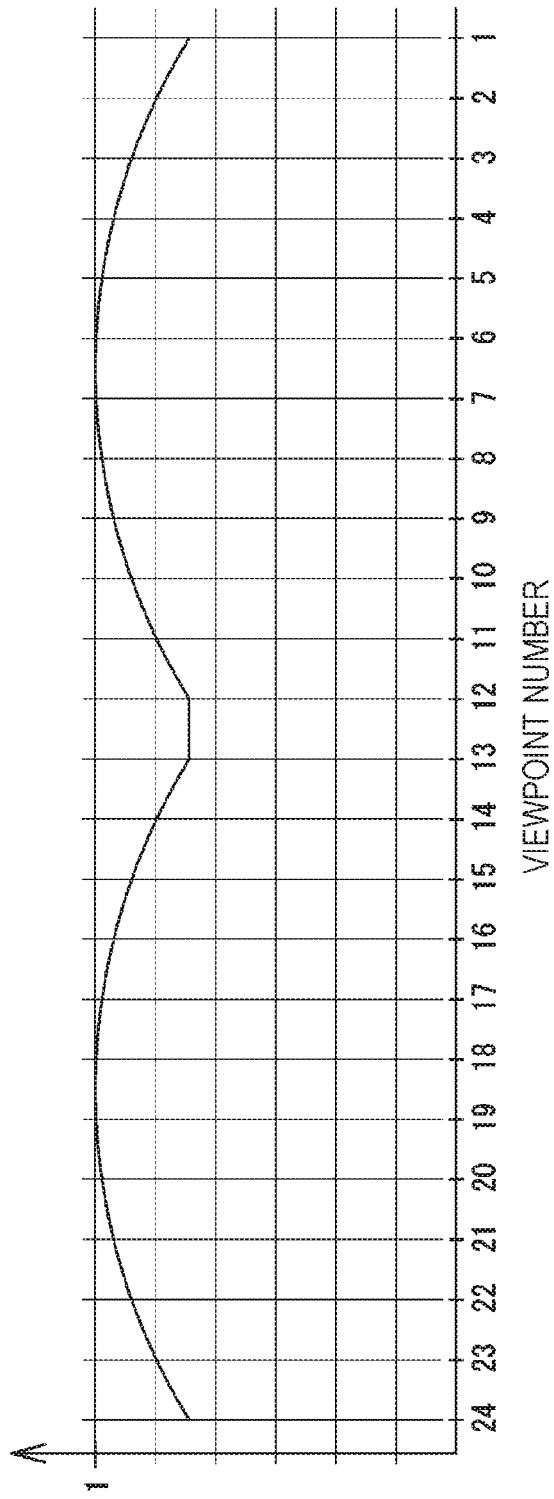
FIG. 23 is a schematic graph of coefficients (gain values) to be multiplied by image data DR, DL.

FIG. 22 is a schematic flowchart for illustrating operation when displaying in the second embodiment. FIG. 23 is a schematic graph of coefficient (gain values) to be multiplied by the image data DR and DL.

The driving unit 100 obtains a deviation amount from the reference position on the basis of position information PS (step S101). Next, the viewpoint number of the pixel 12 is corrected on the basis of the deviation amount (step S102). The above-described operation is similar to the operation described in the first embodiment, so that the description thereof is omitted.

For the pixels 12 with the corrected viewpoint numbers 1 to 12, the right-eye image data DR is selected and they are multiplied by the coefficients according to the viewpoint numbers to be driven on the basis of the values. Also, for the pixels 12 with the corrected viewpoint numbers 13 to 24, the left-eye image data DL is selected and they are multiplied by the coefficients according to the viewpoint numbers to be driven on the basis of the values (steps S103, S104A, and S105A).

As illustrated in FIG. 23, the graph of the coefficients to be multiplied by the image data DR and DL has a convex shape that becomes maximum at the center of a range of the viewpoint numbers 1 to 12. The maximum value of the coefficient is normalized to 1. Also, this has a convex shape that becomes maximum at the center of the range of the viewpoint numbers 13 to 24, basically the shape similar to that in the range of the viewpoint numbers 1 to 12.

Figure 24:
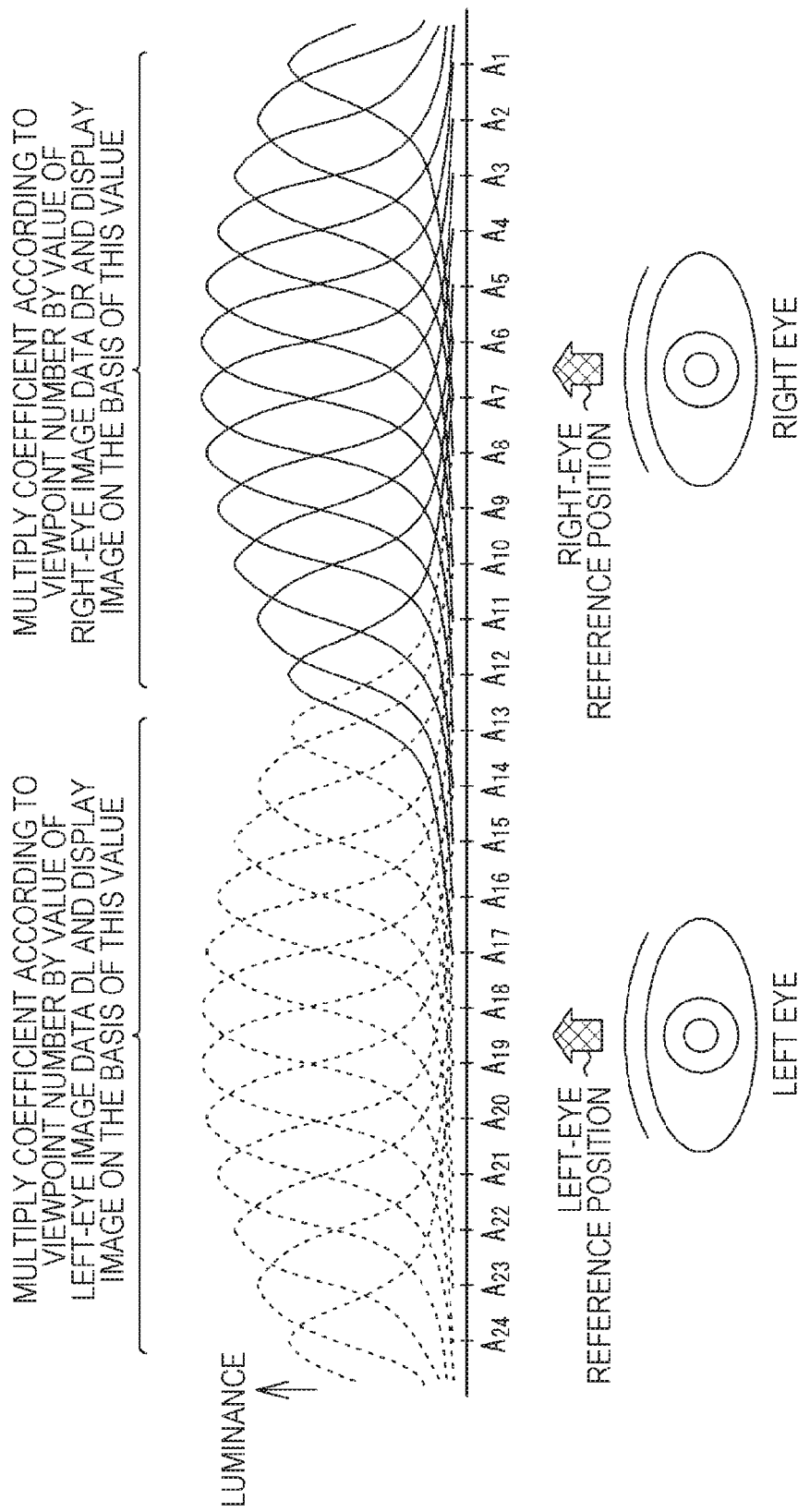
FIG. 24 is a schematic diagram for illustrating a state when an image observer observes an image at a reference position in design in the second embodiment.
Figure 25:
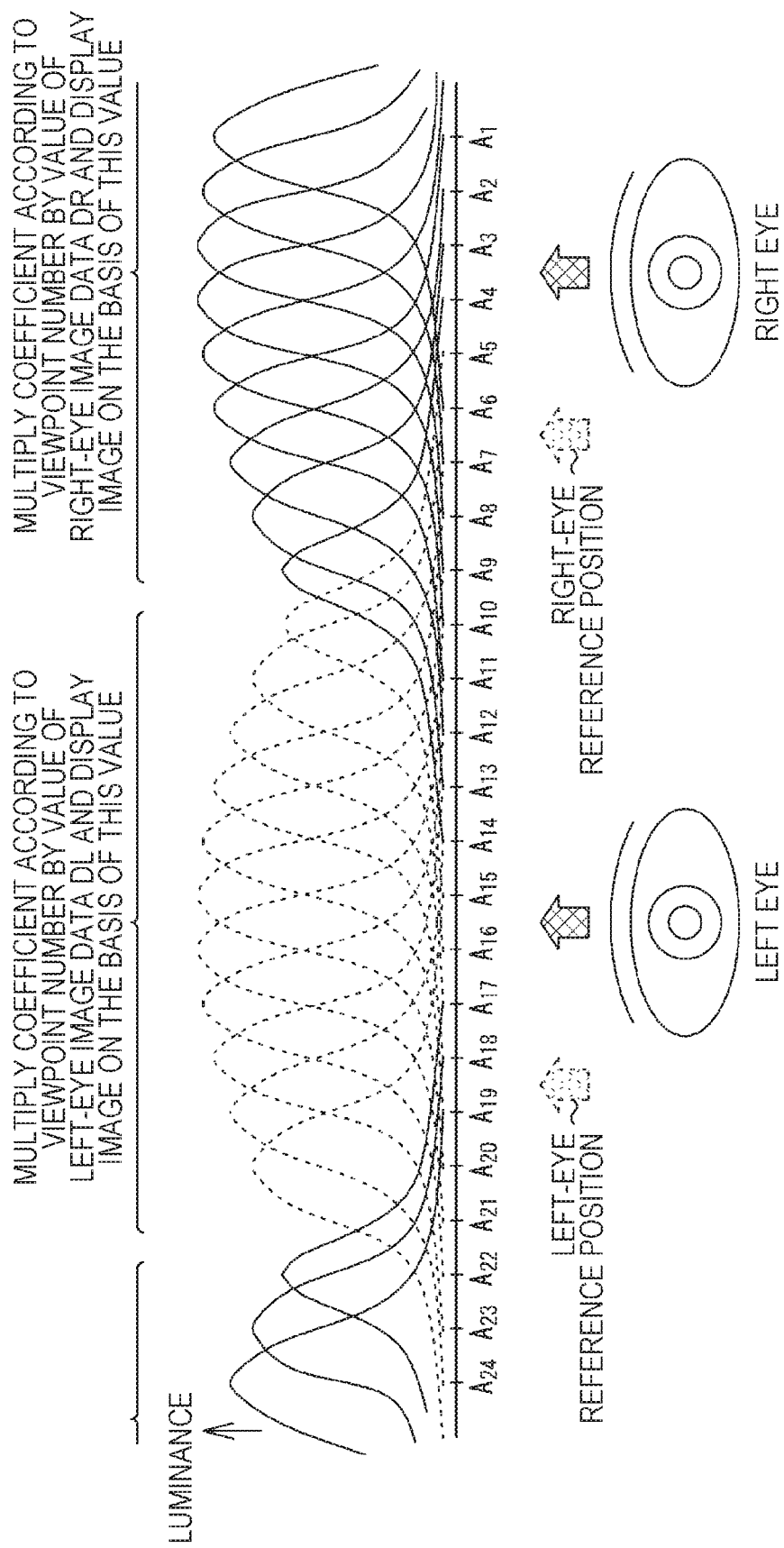
FIG. 25 is a schematic diagram for illustrating a state in which the image observer observes the image at a position deviated in a +X direction from the reference position in design in the second embodiment.

FIG. 24 is a schematic diagram for illustrating a state when an image observer observes the image at a reference position in design in the second embodiment. FIG. 25 is a schematic diagram for illustrating a state in which the image observer observes the image at a position deviated in a +X direction from the reference position in design in the second embodiment.

As is clear from comparison between FIG. 14 and FIG. 24 or between FIG. 16 and FIG. 25, in the second embodiment, a left-eye image observed with a right eye is more suppressed, and similarly, a right-eye image observed with a left eye is more suppressed.

Also, since the coefficients multiplied by the image data DR and DL are normalized so as to be maximum in the vicinity of positions where the right eye and the left eye are located, the image observer may observe the image having luminance substantially similar to that in the first embodiment in which crosstalk is more suppressed.

Meanwhile, the shape of the graph of the coefficients to be multiplied by the image data DR and DL is not especially limited, and this may be appropriately set to a preferable shape on the basis of actual measurement and the like.

Third Embodiment

In a case where an optical separating unit is formed by using a lens sheet, a degree of refraction of light differs between a case of front view and a case of oblique view. Therefore, if a viewpoint number is corrected on the basis only of position information from a position detecting unit, correction might be insufficient.

In a third embodiment, the optical separating unit is formed of the lens sheet, and a driving unit corrects the viewpoint number of a pixel on the basis of a reference viewpoint number, the position information from the position detecting unit, and an optical characteristic of the lens sheet.

Figure 26:
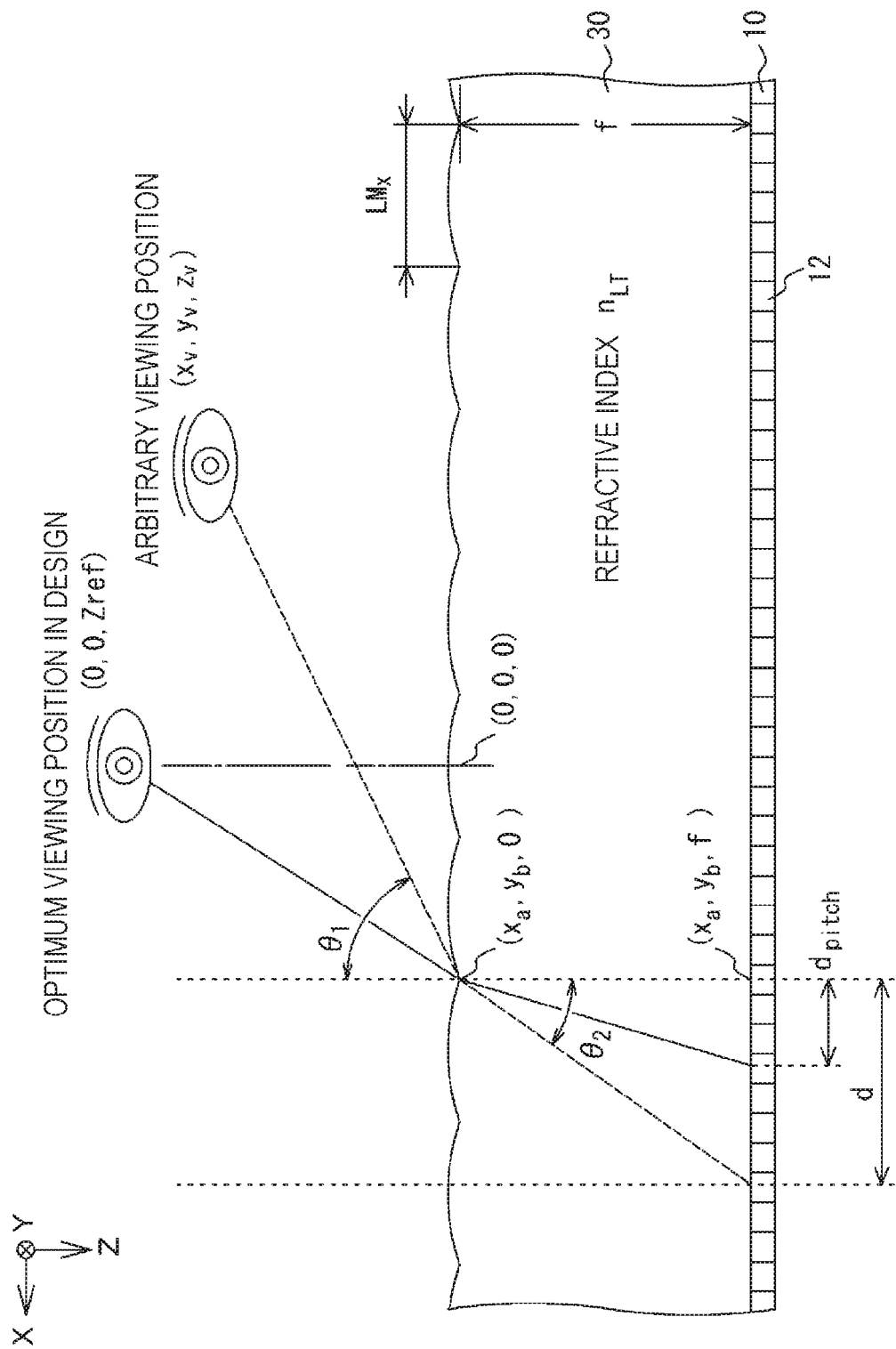
FIG. 26 is a schematic cross-sectional view for illustrating a relationship between an observer's position and an observed pixel in a third embodiment.

FIG. 26 is a schematic cross-sectional view for illustrating a relationship between an observer's position and a pixel to be observed in the third embodiment.

In the third embodiment, an optical separating unit 30 formed of a lenticular lens sheet is superimposed on a display unit 10. An array pitch $LM_x$ of the lenticular lenses in an X direction is similar to the array pitch $LM_x$ illustrated in FIG. 5 referred to in the first embodiment. Meanwhile, for convenience of illustration, an array of pixels 12 is schematically illustrated in FIG. 26 without a black matrix 13 is illustrated.

It is assumed that a thickness of the lenticular lens coincides with a focal length in design "f". Also, a refractive index of an optical material forming the lenticular lens sheet is represented as "$n_{LT}$", and a refractive index of a space is set to "1".

A coordinate position of an (a, b)-th pixel is represented as ($x_a$, $y_b$, f). A reference sign $d_{pitch}$ represents a deviation amount from coordinates on the display unit being viewed when a coordinate position ($x_a$, $y_b$, 0) is viewed from an optimum viewing position (0, 0, $Z_{ref}$). Meanwhile, the deviation amount in the X direction is represented by a reference sign $d_{pitch\_x}$ and the deviation amount in a Y direction is represented by a reference sign $d_{pitch\_y}$.

A viewpoint movement amount in a case where a viewing position changes from the optimum viewing position (0, 0, $Z_{ref}$) to a certain arbitrary viewing position ($X_v$, $y_v$, $z_v$) may be obtained on the basis of geometric optical calculation.

From FIG. 26, the following expression is obtained.

$$\sin\theta_1 = n_{LT} \times \sin\theta_2$$
$$= (x_v - x_a)/\{[z_v^2 + (x_v - x_a)^2]^{1/2}\}$$
$$\sin\theta_2 = d/\{[f^2 + d^2]^{1/2}\}$$

By expressing the deviation amount of the viewpoint in the X direction as $d_x$(a, b) and the deviation amount of the viewpoint in the Y direction as $d_y$(a, b) with the (a, b)-th pixel as a reference, they are represented by the following expression.

$$d_x(a,b)=f\times(x_v-x_a)/\{[n_{LT}^2\times(z_v^2+(x_v-x_a)^2)-(x_v-x_a)^2]^{1/2}\}$$

$$d_y(a,b)=f\times(y_v-y_a)/\{[n_{LT}^2\times(z_v^2+(y_v-y_a)^2)-(y_v-y_a)^2]^{1/2}\}$$

Herein, if a width per viewing point in the X direction and that in the Y direction are represented by reference signs $p_{1view\_x}$ and $p_{1view\_y}$, respectively, $p_{1view\_x}=LM_x/LX$ and $p_{1view\_y}=p_{1view\_x}\times(PL_Y/PL_X)\times SL$ are obtained.

Meanwhile, the reference signs LX, SL, $PL_X$, and $PL_Y$ are similar to those described in the first embodiment. That is, the reference sign LX represents the number of pixels included in the array pitch $LM_X$ of structure bodies of the optical separating unit 30, and the reference sign SL represents inclination of the structure body of the optical separating unit 30 calculated in a unit of the number of pixels. The reference signs $PL_X$ and $PL_Y$ represent lengths of the pixel 12 in the X direction and Y direction, respectively.

From the above-described results, $\Delta V_x(a, b) = ((d_x(a, b) - d_{pitch\_x})/p_{1view\_x})$ mod LX) and $\Delta V_y(a, b) = ((d_y(a, b) - d_{pitch\_y})/p_{1view\_y})$ mod LX) may be obtained. The viewpoint number may be corrected on the basis of the results. Basically, it is sufficient to perform operation of adding $\Delta V_x$ (a, b) and $\Delta V_y$ (a, b) to the above-mentioned Vi_Ref [a, b]. Meanwhile, in a case where the result does not fall within a range from 1 to P, operation such as calculating the remainder may be performed as appropriate.

Meanwhile, in the above description, it is assumed that the thickness of the lenticular lens coincides with the focal length in design "f". Actually, the thickness of the lenticular lens might vary within a plane. In this case, when obtaining $d_x(a, b)$ and $d_y(a, b)$, "f" may be handled to be given by a function and the like according to a position in the plane.

It is also possible to configure such that $d_x(a, b)$ and $d_y(a, b)$ are obtained by taking difference in focal length due to field curvature of the lenticular lens into consideration.

Figure 27:
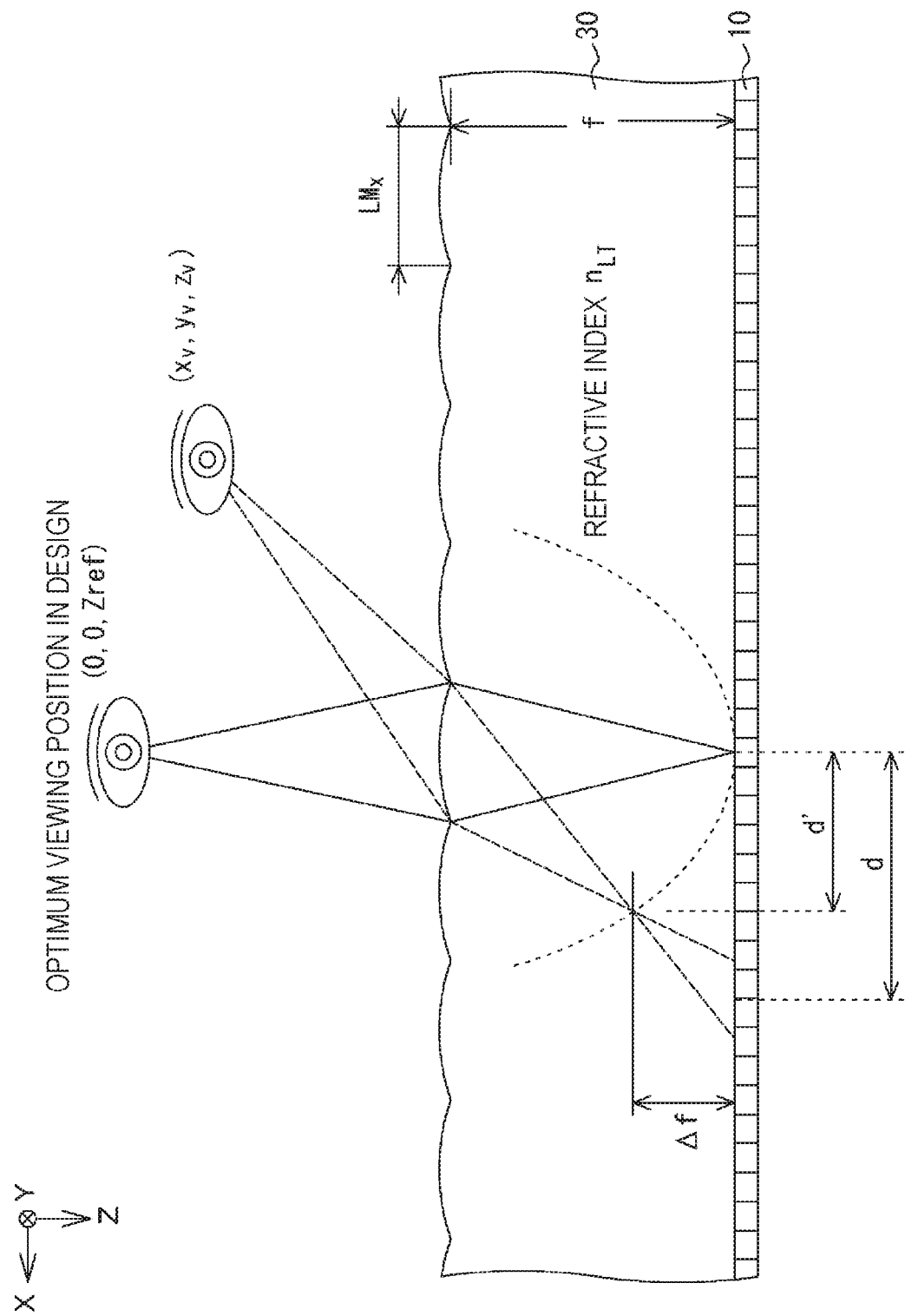
FIG. 27 is a schematic cross-sectional view for illustrating a relationship between the observer's position and the observed pixel in a case where a substantial focal length of a lens sheet forming an optical separating unit is taken into consideration.

For example, as illustrated in FIG. 27, the focal length of the lens varies between a case of front viewing and a case of oblique view. A reference sign "d" represents a deviation amount in a case where the center of an area enlarged by the field curvature is used. A reference sign "d'" represents a deviation amount when it is assumed that there is the pixel at a position obtained by subtracting focal distance difference $\Delta f$ due to the field curvature from the thickness "f" of the lenticular lens.

Depending on a configuration of the lenticular lens, it may be considered that a characteristic is better when "d'" is used in place of the reference sign "d". In such a case, calculations may be performed after substituting "f-$\Delta f$" for "f" in the expressions for obtaining $d_x(a, b)$ and $d_y(a, b)$.

In the description of each of the above-described embodiments, the table storing the correspondence relationship between the pixels 12 forming the pixel group and the observation positions $A_1$ to $A_P$ is assumed to be commonly set in each pixel group. However, for example, the correspondence relationship between the pixels 12 forming the pixel group and the observation positions $A_1$ to $A_P$ differs between a case where a display area 11 is viewed in a normal direction and a case where the display area 11 is viewed in an oblique direction.

In such a case, it may be configured such that the correcting unit which corrects the image to be displayed on the display unit is provided so as to compensate for the effect due to the deviation from the reference position of the observer. In this case, the correcting unit may be configured to include a plurality of tables each storing the correspondence relationship between the pixels 12 forming the pixel group and the observation positions $A_1$ to $A_P$ corresponding to the position of the pixel group in the display area 11, and the driving unit 100 may be configured to control the image to be displayed by the pixel group on the basis of the table corresponding to the position of the pixel group in the display area 11 and the position information from the position detecting unit 40. For example, in a case where the optical separating unit 30 is formed of the lenticular lens, a table taking an effect of aberration such as the field curvature into consideration may be prepared corresponding to the position of the pixel group in the display area 11. Alternatively, the correcting unit may be configured to control the image to be displayed by the relational expression based on the correspondence relationship between the pixels 12 forming the pixel group and the observation positions $A_1$ to $A_P$ corresponding to the position of the pixel group in the display area 11.

Application Example (Example of Electronic Device)

An application example of the above-described display device to an electronic device is described. As the electronic device, there is an electronic device which displays an externally input video signal or an internally generated video signal as an image or video.

Application Example 1

Figure 28A:
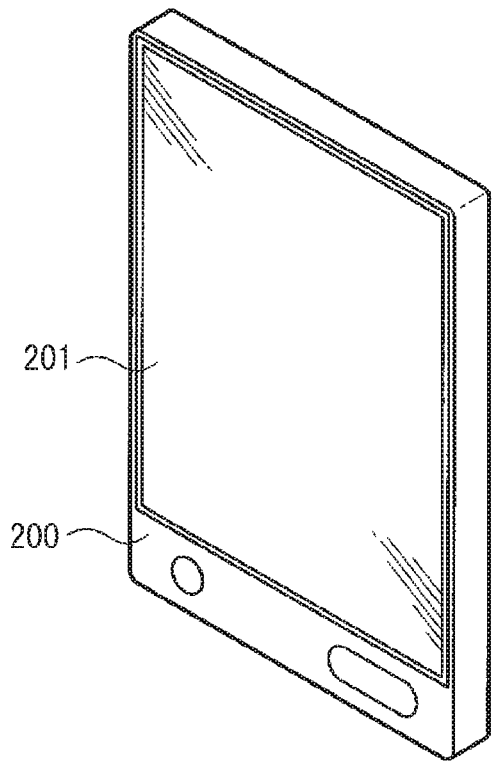
FIG. 28A and FIG. 28B are views each illustrating an appearance of a smartphone to which the display device of the embodiment is applied.
Figure 28B:
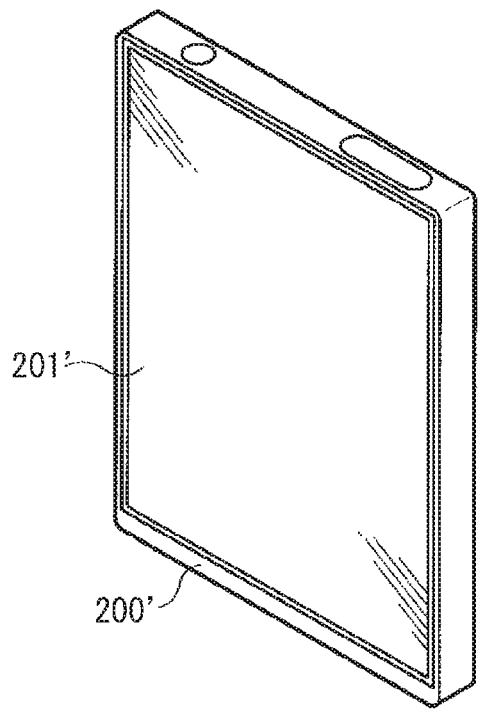

FIGS. 28A and 28B illustrate an appearance of a smartphone to which the display device of the above-described embodiment is applied. Smartphones 200 and 200' include, for example, video display screens 201 and 201', respectively. The video display screens 200 and 201' are formed of the display device of the above-described embodiment. By applying the display device of the above-described embodiment, it is possible to display a stereoscopic image with small crosstalk, so that this may contribute to improvement in quality of the smartphones 200 and 201'.

Application Example 2

Figure 29:
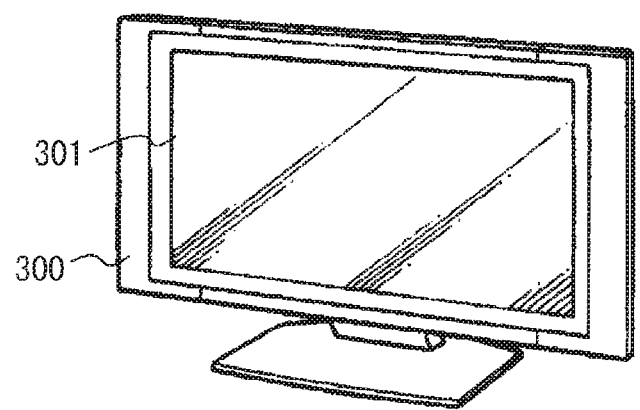
FIG. 29 illustrates an appearance of a television device to which the display device of the embodiment is applied.
Figure 30:
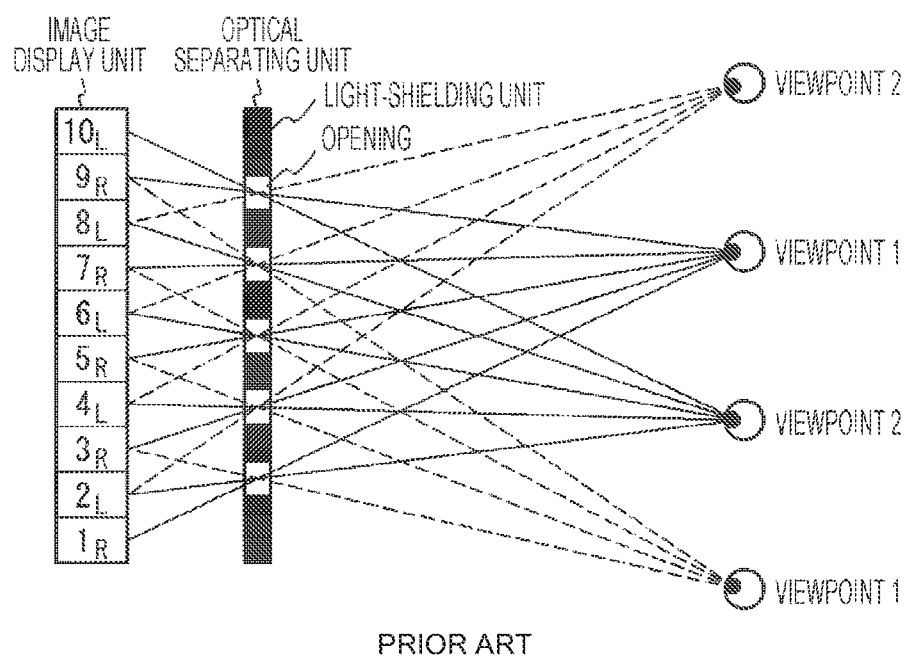
FIG. 30 is a conceptual diagram of a naked-eye type display device.

FIG. 29 illustrates an appearance of a television device to which the display device of the above-described embodiment is applied. A television device 300 includes, for example, a video display screen 301. The video display screen 301 is formed of the display device of the embodiment. By applying the display device of the above-described embodiment, it is possible to display a stereoscopic image with small crosstalk, so that this may contribute to improvement in quality of the television device 300.

Although the embodiments of the present disclosure are heretofore described specifically, the present disclosure is not limited to the above-described embodiments, and various modifications based on the technical idea of the present disclosure may be made. For example, numerical values, structures, substrates, materials, processes and the like mentioned in the above-described embodiments are merely examples, and numerical values, structures, substrates, materials, processes and the like different from those may also be used as needed.

Meanwhile, the technology of the present disclosure may also have the following configuration.

[1]

A display device including:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

[2]

The display device according to [1] described above, in which the driving unit selects image data corresponding to a pixel which should display the right-eye image from right-eye image data which displays the right-eye image on an entire surface of the display area to drive the pixel, and selects image data corresponding to a pixel which should display the left-eye image from left-eye image data which displays the left-eye image on an entire surface of the display area to drive the pixel.

[3]

The display device according to [1] or [2] described above, in which, when the plurality of predetermined observation positions is represented as observation positions $A_1$ to $A_P$, an observation position $A_{P/4}$ is set to correspond to a right-eye reference position and an observation position $A_{3P/4}$ is set to correspond to a left-eye reference position.

[4]

The display device according to [3] described above, in which the driving unit controls the image to be displayed on the display unit such that the right-eye image is observed at the observation positions $A_1$ to $A_{P/2}$ and the left-eye image is observed at the observation positions $A_{(P/2)+1}$ to $A_P$ when the observer's eyes are at predetermined reference positions, and controls the image to be displayed on the display unit such that the image is observed in a state similar to the state when the observer's eyes are at the predetermined reference positions when the observer's eyes are at positions deviated from the predetermined reference positions.

[5]

The display device according to [4] described above, in which a pixel group formed of a plurality of pixels is formed in the display area on the basis of an arrangement relationship between an array of the pixels and the structure bodies of the optical separating unit, and the driving unit corrects a viewpoint number corresponding to a pixel on the basis of a reference viewpoint number determined by a correspondence relationship between the pixels forming the pixel group and the observation positions $A_1$ to $A_P$ and the position information from the position detecting unit, to control the image to be displayed on the display unit.

[6]

The display device according to [5] described above, in which the driving unit corrects the viewpoint number of the pixel on the basis of the reference viewpoint number and the position information from the position detecting unit, and selects any one of the right-eye image data and the left-eye image data on the basis of a value of the corrected viewpoint number to drive the pixel.

[7]

The display device according to [6] described above, in which the driving unit multiplies the image data by a coefficient according to the value of the viewpoint number to drive the pixel.

[8]

The display device according to any one of [5] to [7] described above, in which the driving unit is provided with a table storing the reference viewpoint number commonly used in each pixel group.

[9]

The display device according to any one of [5] to [8] described above, in which the optical separating unit is formed of a lens sheet, and the driving unit corrects the viewpoint number of the pixel on the basis of the reference viewpoint number, the position information from the position detecting unit, and an optical characteristic of the lens sheet.

[10]

The display device according to [5] described above, including:

a correcting unit which corrects the image to be displayed on the display unit so as to compensate for an effect due to deviation from the reference position.

[11]

The display device according to [10] described above, in which the correcting unit includes a plurality of tables each storing the correspondence relationship between the pixels forming the pixel group and the observation positions $A_1$ to $A_P$ corresponding to a position of the pixel group in the display area, and the driving unit controls the image to be displayed by the pixel group on the basis of the table corresponding to the position of the pixel group in the display area and the position information from the position detecting unit.

[12]

The display device according to [10] described above, in which the correcting unit controls the image to be displayed by a relational expression based on the correspondence relationship between the pixels forming the pixel group and the observation positions $A_1$ to $A_P$ corresponding to a position of the pixel group in the display area.

[13]

A method of driving a display device including:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

[14]

The method of driving the display device according to [13] described above, in which the driving unit selects image data corresponding to a pixel which should display the right-eye image from right-eye image data which displays the right-eye image on an entire surface of the display area to drive the pixel, and selects image data corresponding to a pixel which should display the left-eye image from left-eye image data which displays the left-eye image on an entire surface of the display area to drive the pixel.

[15]

The method of driving the display device according to [13] or [14] described above, in which, when the plurality of predetermined observation positions is represented as observation positions $A_1$ to $A_P$, an observation position $A_{P/4}$ is set to correspond to a right-eye reference position and an observation position $A_{3P/4}$ is set to correspond to a left-eye reference position.

[16]

The method of driving the display device according to [15] described above, in which the driving unit controls the image to be displayed on the display unit such that the right-eye image is observed at the observation positions $A_1$ to $A_{P/2}$ and the left-eye image is observed at the observation positions $A_{(P/2)+1}$ to $A_P$ when the observer's eyes are at predetermined reference positions, and controls the image to be displayed on the display unit such that the image is observed in a state similar to the state when the observer's eyes are at the predetermined reference positions when the observer's eyes are at positions deviated from the predetermined reference positions.

[17]

The method of driving the display device according to [16] described above, in which a pixel group formed of a plurality of pixels is formed in the display area on the basis of an arrangement relationship between an array of the pixels and the structure bodies of the optical separating unit, and the driving unit corrects a viewpoint number corresponding to a pixel on the basis of a reference viewpoint number determined by a correspondence relationship between the pixels forming the pixel group and the observation positions $A_1$ to $A_P$ and the position information from the position detecting unit, to control the image to be displayed on the display unit.

[18]

The method of driving the display device according to [17] described above, in which the driving unit corrects the viewpoint number of the pixel on the basis of the reference viewpoint number and the position information from the position detecting unit, and selects any one of the right-eye image data and the left-eye image data on the basis of a value of the corrected viewpoint number to drive the pixel.

[19]

The method of driving the display device according to [18] described above, in which the driving unit multiplies the image data by a coefficient according to the value of the viewpoint number to drive the pixel.

[20]

The method of driving the display device according to any one of [17] to [19] described above, in which the driving unit is provided with a table storing the reference viewpoint number commonly used in each pixel group.

[21]

The method of driving the display device according to any one of [17] to [20] described above, in which the optical separating unit is formed of a lens sheet, and the driving unit corrects the viewpoint number of the pixel on the basis of the reference viewpoint number, the position information from the position detecting unit, and an optical characteristic of the lens sheet.

[22]

The method of driving the display device according to [21] described above, in which the table storing the correspondence relationship between the pixels forming the pixel group and the observation positions $A_1$ to $A_P$ is commonly set in each pixel group.

[23]

The method of driving the display device according to [21] described above, including:

a correcting unit which corrects the image to be displayed on the display unit so as to compensate for an effect due to deviation from the reference position.

[24]

The method of driving the display device according to [23] described above, in which the correcting unit includes a plurality of tables each storing the correspondence relationship between the pixels forming the pixel group and the observation positions $A_1$ to $A_P$ corresponding to a position of the pixel group in the display area, and the driving unit controls the image to be displayed by the pixel group on the basis of the table corresponding to the position of the pixel group in the display area and the position information from the position detecting unit.

[25]

The method of driving the display device according to [23] described above, in which the correcting unit controls the image to be displayed by a relational expression based on the correspondence relationship between the pixels forming the pixel group and the observation positions $A_1$ to $A_P$ corresponding to the position of the pixel group in the display area.

[26]

An electronic device including a display device, the display device provided with:

a display unit including a display area which displays a two-dimensional image;

an optical separating unit configured to separate the image displayed in the display area into images to be observed at a plurality of predetermined observation positions set so as to be arranged at intervals in a horizontal direction, respectively;

a position detecting unit which detects position information of an image observer; and a driving unit which drives the display unit, in which pixels in the display area are arranged in a matrix in a horizontal direction and in a vertical direction, structure bodies of the optical separating unit are arranged at a predetermined angle with respect to the vertical direction, an array pitch in the horizontal direction of the structure bodies being set to be a non-integral multiple of the array pitch in the horizontal direction of the pixels in the display area, and the driving unit controls the image to be displayed on the display unit such that a right-eye image is observed at each of a plurality of observation positions located in the vicinity of an observer's right eye and a left-eye image is observed at each of a plurality of observation positions located in the vicinity of an observer's left eye on the basis of the position information from the position detecting unit.

[27]

The electronic device according to [26] described above, in which the driving unit selects image data corresponding to a pixel which should display the right-eye image from right-eye image data which displays the right-eye image on an entire surface of the display area to drive the pixel, and selects image data corresponding to a pixel which should display the left-eye image from left-eye image data which displays the left-eye image on an entire surface of the display area to drive the pixel.

[28]

The electronic device according to [26] or [27] described above, in which, when the plurality of predetermined observation positions is represented as observation positions $A_1$ to $A_P$, an observation position $A_{P/4}$ is set to correspond to a right-eye reference position and an observation position $A_{3P/4}$ is set to correspond to a left-eye reference position.

[29]

The electronic device according to [28] described above, in which the driving unit controls the image to be displayed on the display unit such that the right-eye image is observed at the observation positions $A_1$ to $A_{P/2}$ and the left-eye image is observed at the observation positions $A_{(P/2)+1}$ to $A_P$ when the observer's eyes are at predetermined reference positions, and controls the image to be displayed on the display unit such that the image is observed in a state similar to the state when the observer's eyes are at the predetermined reference positions when the observer's eyes are at positions deviated from the predetermined reference positions.

[30]

The electronic device according to [29] described above, in which a pixel group formed of a plurality of pixels is formed in the display area on the basis of an arrangement relationship between an array of the pixels and the structure bodies of the optical separating unit, and the driving unit corrects a viewpoint number corresponding to a pixel on the basis of a reference viewpoint number determined by a correspondence relationship between the pixels forming the pixel group and the observation positions $A_1$ to $A_P$ and the position information from the position detecting unit, to control the image to be displayed on the display unit.

[31]

The electronic device according to [30] described above, in which the driving unit corrects the viewpoint number of the pixel on the basis of the reference viewpoint number and the position information from the position detecting unit, and selects any one of the right-eye image data and the left-eye image data on the basis of a value of the corrected viewpoint number to drive the pixel.

[32]

The electronic device according to [31] described above, in which the driving unit multiplies the image data by a coefficient according to the value of the viewpoint number to drive the pixel.

[33]

The electronic device according to any one of [30] to [32] described above, in which the driving unit is provided with a table storing the reference viewpoint number commonly used in each pixel group.

[34]

The electronic device according to any one of [30] to [33] described above, in which the optical separating unit is formed of a lens sheet, and the driving unit corrects the viewpoint number of the pixel on the basis of the reference viewpoint number, the position information from the position detecting unit, and an optical characteristic of the lens sheet.

[35]

The electronic device according to [34] described above, in which the table storing the correspondence relationship between the pixels forming the pixel group and the observation positions $A_1$ to $A_P$ is commonly set in each pixel group.

[36]

The electronic device according to [34] described above, including:

a correcting unit which corrects the image to be displayed on the display unit so as to compensate for an effect due to deviation from the reference position.

[37]

The electronic device according to [36] described above, in which the correcting unit includes a plurality of tables each storing the correspondence relationship between the pixels forming the pixel group and the observation positions $A_1$ to $A_P$ corresponding to a position of the pixel group in the display area, and the driving unit controls the image to be displayed by the pixel group on the basis of the table corresponding to the position of the pixel group in the display area and the position information from the position detecting unit.

[38]

The electronic device according to [36] described above, in which the correcting unit controls the image to be displayed by a relational expression based on the correspondence relationship between the pixels forming the pixel group and the observation positions $A_1$ to $A_P$ corresponding to the position of the pixel group in the display area.

REFERENCE SIGNS LIST

1 Display device
10 Display unit
11 Display area
12 Pixel
13 Black matrix
20 Illuminating unit
21 Light-emitting surface
30 Optical separating unit
31 Opening
32 Light shielding unit
40 Position detecting unit
100 Driving unit
200, 200' Smartphone
200, 201' Video display screen
300 Television Device
301 Video display screen
DR Right-eye image data
DL Left-eye image data
$A_1$ to $A_P$ Observation position

The invention claimed is:

1. A display device, comprising:
   a display unit including a display area, wherein the display unit is configured to display a two-dimensional image in the display area;
   an optical separating unit configured to separate the two-dimensional image into a plurality of images, wherein
      the plurality of images is observable at a plurality of specific observation positions arranged at specific intervals in a horizontal direction;
   a position detecting unit configured to detect position information of an image observer; and
   a driving unit configured to drive the display unit, wherein
      a plurality of pixels in the display area is arranged in a matrix in the horizontal direction and in a vertical direction,
      a plurality of openings in the optical separating unit is arranged at a specific angle with respect to the vertical direction,
      an array pitch, in the horizontal direction, of the plurality of openings is a non-integral multiple of an array pitch, in the horizontal direction, of the plurality of pixels in the display area,
      the driving unit is further configured to control, based on the position information of the image observer, a display of an image of the plurality of images such that a right-eye image is observable at each of a first plurality of observation positions of the plurality of specific observation positions and a left-eye image is observable at each of a second plurality of observation positions of the plurality of specific observation positions, and
      the first plurality of observation positions is in a vicinity of an observer's right eye and the second plurality of observation positions is in the vicinity of an observer's left eye.

2. The display device according to claim 1, wherein the driving unit is further configured to:
   select first image data corresponding to a first set of pixels of the plurality of pixels;
   drive the first set of pixels to display the right-eye image on an entire surface of the display area,
      wherein the display of the right-eye image is based on right-eye image data;
   select second image data corresponding to a second set of pixels of the plurality of pixels; and
   drive the second set of pixels to display the left-eye image on the entire surface of the display area,
      wherein the display of the left-eye image is based on left-eye image data.

3. The display device according to claim 2, wherein
   the plurality of specific observation positions corresponds to observation positions $A_1$ to $A_P$,
   an observation position $A_{P/4}$ corresponds to a right-eye reference position and
   an observation position $A_{3P/4}$ is corresponds to a left-eye reference position.

4. The display device according to claim 3, wherein the driving unit is further configured to:
   control, in a first state in which the observer's right eye is at a first reference position and the observer's left eye is at a second reference position, the display of the image such that the right-eye image is observable at observation positions $A_1$ to $A_{P/2}$ and the left-eye image is observable at observation positions $A_{(P/2)+1}$ to $A_P$; and
   control, in a second state in which the observer's right eye is deviated from the first reference position and the observer's left eye is deviated from the second reference position, the display of the image such that the image is observable in a third state similar to the first state.

5. The display device according to claim 4, wherein
   the display area includes a pixel group,
   the pixel group includes the plurality of pixels,
   the pixel group is based on an arrangement relationship between an array of the plurality of pixels and the plurality of openings, and
   the driving unit is further configured to:
      determine a reference viewpoint number based on a correspondence relationship between the plurality of pixels of the pixel group and the observation positions $A_1$ to $A_P$;
      correct a viewpoint number corresponding to a pixel of the plurality of pixels based on the determined reference viewpoint number and the position information; and
      control the display of the image based on the corrected viewpoint number.

6. The display device according to claim 5, wherein the driving unit is further configured to select at least one of the right-eye image data or the left-eye image data based on a value of the corrected viewpoint number.

7. The display device according to claim 6, wherein the driving unit is further configured to multiply at least one of the first image data or the second image data by a coefficient based on the value of the corrected viewpoint number.

8. The display device according to claim 5, wherein the driving unit comprises a table that includes the reference viewpoint number commonly used in each pixel group.

9. The display device according to claim 5, wherein
   the optical separating unit includes a lens sheet, and
   the driving unit is further configured to correct the viewpoint number of the pixel of the plurality of pixels based on the reference viewpoint number, the position information of the image observer, and an optical characteristic of the lens sheet.

10. The display device according to claim 5, further comprising a correcting unit configured to correct the image to compensate for an effect due to the deviation from the first reference position and the second reference position.

11. The display device according to claim 10, wherein
    the correcting unit includes a plurality of tables,
    each of the plurality of tables includes the correspondence relationship between the plurality of pixels of the pixel group and the observation positions $A_1$ to $A_P$ corresponding to a position of the pixel group in the display area, and
    the driving unit is further configured to control, based on a table of the plurality tables and the position information, the display of the image.

12. The display device according to claim 10, wherein the correcting unit is further configured to control, based on the correspondence relationship between the plurality of pixels of the pixel group and the observation positions $A_1$ to $A_P$ corresponding to a position of the pixel group in the display area, the display of the image.

13. A method, comprising:
    in a display device that includes a display unit, an optical separating unit, a position detecting unit, and a driving unit:
       displaying, by the display unit, a two-dimensional image in a display area of the display unit;

separating, by the optical separating unit, the two-dimensional image into a plurality of images, wherein
  the plurality of images is observable at a plurality of specific observation positions arranged at specific intervals in a horizontal direction;
detecting, by the position detecting unit, position information of an image observer;
driving, by the driving unit, the display unit, wherein
  a plurality of pixels in the display area is arranged in a matrix in the horizontal direction and in a vertical direction,
  a plurality of openings in the optical separating unit is arranged at a specific angle with respect to the vertical direction, and
  an array pitch, in the horizontal direction, of the plurality of openings is a non-integral multiple of an array pitch, in the horizontal direction, of the plurality of pixels in the display area; and
controlling, by the driving unit, based on the position information of the image observer, a display of an image of the plurality of images such that a right-eye image is observable at each of a first plurality of observation positions of the plurality of specific observation positions and a left-eye image is observable at each of a second plurality of observation positions of the plurality of specific observation positions, wherein
  the first plurality of observation positions is in a vicinity of an observer's right eye and the second plurality of observation positions is in the vicinity of an observer's left eye.

14. An electronic device, comprising:
a display device that includes:
  a display unit including a display area, wherein the display unit is configured to display a two-dimensional image in the display area;
  an optical separating unit configured to separate the two-dimensional image into a plurality of images, wherein
    the plurality of images is observable at a plurality of specific observation positions arranged at specific intervals in a horizontal direction;
  a position detecting unit configured to detect position information of an image observer; and
  a driving unit configured to drive the display unit, wherein
    a plurality of pixels in the display area is arranged in a matrix in the horizontal direction and in a vertical direction,
    a plurality of openings in the optical separating unit is arranged at a specific angle with respect to the vertical direction,
    an array pitch, in the horizontal direction, of the plurality of openings is a non-integral multiple of an array pitch, in the horizontal direction, of the plurality of pixels in the display area,
  the driving unit is further configured to control, based on the position information of the image observer, a display of an image of the plurality of images such that a right-eye image is observable at each of a first plurality of observation positions of the plurality of specific observation positions and a left-eye image is observable at each of a second plurality of observation positions of the plurality of specific observation positions, and
  the first plurality of observation positions is in a vicinity of an observer's right eye and the second plurality of observation positions is in the vicinity of an observer's left eye.

* * * * *